(12) United States Patent
Itoh et al.

(10) Patent No.: US 9,182,792 B2
(45) Date of Patent: Nov. 10, 2015

(54) PORTABLE ELECTRONIC APPARATUS

(75) Inventors: Hiroki Itoh, Yokohama (JP); Takayuki Yajima, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 834 days.

(21) Appl. No.: 13/451,357

(22) Filed: Apr. 19, 2012

(65) Prior Publication Data

US 2012/0268401 A1    Oct. 25, 2012

Related U.S. Application Data

(63) Continuation of application No. 12/414,268, filed on Mar. 30, 2009, now Pat. No. 8,185,170.

(30) Foreign Application Priority Data

| Mar. 28, 2008 | (JP) | 2008-088715 |
| Mar. 28, 2008 | (JP) | 2008-088717 |
| Apr. 25, 2008 | (JP) | 2008-116324 |
| May 29, 2008 | (JP) | 2008-141748 |
| Jun. 2, 2008  | (JP) | 2008-144421 |

(51) Int. Cl.
*H04M 1/00* (2006.01)
*G06F 1/16* (2006.01)
(Continued)

(52) U.S. Cl.
CPC .............. *G06F 1/169* (2013.01); *G06F 1/1616* (2013.01); *G06F 1/1647* (2013.01); *G06F 1/1677* (2013.01); *G06F 1/1686* (2013.01);
(Continued)

(58) Field of Classification Search
CPC . H04M 1/72519; H04W 8/245; H04W 12/12; H04W 12/06

USPC .............. 455/575.3, 550, 566, 419, 410, 411
See application file for complete search history.

(56) References Cited

U.S. PATENT DOCUMENTS 6,488,109 B1 *  12/2002  Igaki et al. .................... 180/169
6,965,782 B1 *  11/2005  Nuovo et al. ............. 455/550.1
(Continued)

FOREIGN PATENT DOCUMENTS

| JP | 06-090200 | 3/1994 |
| JP | 07-046520 | 2/1995 |

(Continued)

OTHER PUBLICATIONS

Japanese language office action dated Jun. 5, 2012 and its English language translation issued in corresponding Japanese application 2008144421 cites the foreign patent documents above.

(Continued)

*Primary Examiner* — Joseph Lauture
(74) *Attorney, Agent, or Firm* — Studebaker & Brackett PC

(57) ABSTRACT

An object of the present invention is to provide a cellular telephone terminal in which intuitive operation is possible, by providing a rotary dial portion. A cellular telephone terminal is provided with: a body that includes an operation unit side body, a display part side body, and a hinge mechanism that connects the operation unit side body and the display part side body; a rotary dial portion, which is rotatable around a rotational axis, and which is attached to the body with a standard position; a mark which serves as an indicator for a rotation amount of the rotary dial portion; and a control part that causes one application among a plurality of applications to enter a state in which activation thereof is possible, based on the rotation amount of the rotary dial portion.

1 Claim, 23 Drawing Sheets

(51) Int. Cl.
   *H04M 1/02*   (2006.01)
   *H04M 1/23*   (2006.01)
   *H04W 8/24*   (2009.01)
   *H04W 12/06*   (2009.01)
   *H04W 12/12*   (2009.01)
   *H04M 1/725*   (2006.01)

(52) U.S. Cl.
   CPC ............ *H04M1/0245* (2013.01); *H04M 1/233* (2013.01); *H04M 1/72519* (2013.01); *H04M 2250/52* (2013.01); *H04W 8/245* (2013.01); *H04W 12/06* (2013.01); *H04W 12/12* (2013.01)

(56) References Cited

U.S. PATENT DOCUMENTS

| | | | |
|---|---|---|---|
| 6,980,199 | B2 | 12/2005 | Rekimoto |
| 7,187,368 | B2 | 3/2007 | Rekimoto |
| 7,539,487 | B2 | 5/2009 | Sinclair et al. ............... 455/419 |
| 2003/0169231 | A1 | 9/2003 | Rekimoto |
| 2004/0257334 | A1 | 12/2004 | Yajima |
| 2005/0081164 | A1 | 4/2005 | Hama et al. |
| 2006/0001649 | A1 | 1/2006 | Rekimoto |
| 2007/0300180 | A1 | 12/2007 | Hama et al. |
| 2008/0004084 | A1 | 1/2008 | Park |

FOREIGN PATENT DOCUMENTS

| | | |
|---|---|---|
| JP | 2000-253106 | 9/2000 |
| JP | 2001-245189 | 9/2001 |
| JP | 2001-296960 | 10/2001 |
| JP | 2001-298514 | 10/2001 |
| JP | 2002-041227 | 2/2002 |
| JP | 2002-055766 | 2/2002 |
| JP | 2002-063018 | 2/2002 |
| JP | 2002041227 A | 2/2002 |
| JP | 2002055766 A | 2/2002 |
| JP | 2003-037664 | 2/2003 |
| JP | 2003-223265 | 8/2003 |
| JP | 2003223265 A | 8/2003 |
| JP | 2003-338870 | 11/2003 |
| JP | 2004-172691 | 6/2004 |
| JP | 2006-025347 | 1/2006 |
| JP | 2006-191300 | 7/2006 |
| JP | 2006-215935 | 8/2006 |
| JP | 2007-121963 | 5/2007 |
| JP | 2007-251670 | 9/2007 |
| JP | 2007251670 A | 9/2007 |
| JP | 2008-017457 | 1/2008 |
| KR | 10-2005-0021925 | 3/2008 |

OTHER PUBLICATIONS

Japanese language office action and its English language translation for Japanese application 2008-116324.

Japanese language office action and its English language translation for Japanese application 2008-088715.

Japanese language office action and its English language translation for Japanese application 2008-088717.

Japanese language office action dated Mar. 25, 2013 and its English language translation issued in corresponding Japanese application 2010271981.

* cited by examiner

ASSOCIATE MARK
AND FUNCTION
TABLE

☆ : CALCULATOR
△ : STANDBY
○ : TV
□ : MAIL
× : ADDRESS BOOK
⋮

ASSOCIATE MARK
AND FUNCTION
TABLE

☆ : ALARM
△ : CALCULATOR
○ : STANDBY
□ : TV
× : MAIL
⋮

FIG. 20

| APPLICATION NAME | ORIGINALLY ALLOCATED SYMBOL | SUBSEQUENTLY ALLOCATED SYMBOL |
|---|---|---|
| STANDBY | △ | ○ |
| ADDRESS BOOK | ○ | □ |
| MEMO PAD | □ | × |
| TV | × | ▽ |
| TOOL | ▽ | ◆ |
| CALENDAR | ◆ | ♪ |
| MAIL | ♪ | ☆ |
| CAMERA | ☆ | △ |

PORTABLE ELECTRONIC APPARATUS

This application is a continuation of U.S. application Ser. No. 12/414,268, filed on Mar. 30, 2009, the entire contents of which are incorporated herein by reference. Also this application is based on and claims the benefit of priority under 35 USC 119 from Japanese Patent Application Nos. 2008-088715, 2008-088717, 2008-116324, 2008-141748 and 2008-144421, respectively filed on 28 Mar. 2008, 28 Mar. 2008, 25 Apr. 2008, 29 May 2008 and 2 Jun. 2008, the entire contents of which are incorporated herein by reference.

BACKGROUND OF THE INVENTION

1. Field of the Invention

The present invention relates to a portable electronic apparatus having a rotary dial.

2. Related Art

A more intuitive user interface is demanded in a portable electronic apparatus like a cellular telephone terminal. For example, in a cellular telephone terminal of a flip type having a hinge portion, a cellular telephone terminal is known in which a hinge portion is provided with a rotary dial to be used for a volume control and the like (e.g., refer to Patent Document 1).

In recent years, the portable electronic apparatus like the cellular telephone terminal is made to be multifunctional by installing a radio and television reception function in addition to a principal function.

When the user performs a predetermined operation, the standby screen transitions to a menu selection screen for selecting the other functions, and the user selects a predetermined function on the menu selection screen, thereby making it possible to activate a desired function.

However, since a number of functions are listed on the menu selection screen, it is difficult for an inexperienced user to perform an operation smoothly, and such a user may hesitate to use the portable electronic apparatus itself in some cases.

Incidentally, a digital camera is known which performs a mode change operation in only one function (a photographing function) by a rotary dial. A menu that assists in the mode change operation such as changing from a normal photographing mode to a movie mode (recording animated images) or a continuous shooting mode (taking multiple still images in a short time) is assigned to be selectable to this rotary dial (e.g., refer to Patent Document 2).

[Patent Publication 1] Japanese Unexamined Patent Application, First Publication No. H06-90200

[Patent Publication 2] Japanese Unexamined Patent Application, First Publication No. 2001-245189

SUMMARY OF THE INVENTION

A multiple-menu selecting system by a rotary dial such as that used in a digital camera is not currently employed in a portable electronic apparatus having more than one function.

Moreover, such portable electronic apparatus is different from the digital camera having only photographing function. The multifunctional portable electronic apparatus has two or more independent functions that the digital camera does not have, and a standby screen as a top screen.

Therefore, merely applying a technique as described in Patent Document 2 to the multifunctional portable electronic apparatus causes inconvenience in operating and using.

An object of the present invention is to provide a multifunctional portable electronic apparatus in which intuitive operations are possible by providing a rotary dial portion.

In order to solve the aforementioned problems, a portable electronic apparatus according to the present invention is characterized by including: a display part; a rotary dial portion that is attached to a body so as to be rotatable in a predetermined direction; a rotation detecting part that detects rotation of the rotary dial portion; and a control part that controls such that a predetermined application is activated in accordance with a rotation state detected by the rotation detecting part, and a display screen corresponding to the activated predetermined application is displayed on the display part.

In the aforementioned portable electronic apparatus, it is preferable that: the body is configured with at least a first body having the display part, a second body having an operation unit, and a hinge mechanism that connects the first body and the second body to be changeable in o an opened state and a closed state by way of the hinge mechanism; in which an opened/closed detecting part that detects whether or not the bodies are in the closed state is included, and in which, the control part controls such that, in a case in which the opened/closed detecting part detects that the bodies are not in the closed state when the rotation detecting part has detected the rotation of the rotary dial portion, a predetermined application in accordance with the rotation state is activated, and a display screen corresponding to the activated predetermined application is displayed on the display part, and in a case in which the opened/closed detecting part detects that the bodies are in the closed state when the rotation detecting part has detected the rotation, a new application is not activated.

It is preferable for the aforementioned portable electronic apparatus to be provided with: a body that includes a first body having a first surface, a second body having a second surface, and a hinge mechanism, which connects the first body and the second body foldable; and a mark portion, which is disposed at a position of the bodies, and which serves as an indicator for a rotation position of the rotary dial portion, wherein the position can be visually recognized externally both in the opened state and in the closed state, in which the rotary dial portion is attached to be rotatable and to have a standard position, and in which the control part causes one application among a plurality of applications to enter a state in which activation thereof is possible, based on the rotation position of the rotary dial portion.

In the aforementioned portable electronic apparatus, it is preferable that the control part activates one application among a plurality of applications, based on a rotation position in the rotary dial portion, which is detected by the rotation detecting part.

It is preferable for the aforementioned portable electronic apparatus to be provided with: a memory unit that stores an order of applications associated with rotation amount when each application program is activated; and a display object selecting part, which refers the memory unit and identifies an application corresponding to the rotation amount detected by the rotation detecting part, and which selects a display object corresponding to the identified application, wherein, when the rotary dial portion is rotated, the display object selecting part identifies an application corresponding to the rotation amount detected by the rotation detecting part, and selects a display object corresponding to the identified application as well as display objects corresponding to applications adjacent to the identified application in accordance with the order, and wherein the control part controls such that the display objects thus selected are displayed on the display part.

In the aforementioned portable electronic apparatus, it is preferable that identifiable abstract symbols are allocated to a surface of the rotary dial portion in predetermined intervals in a rotation direction, respectively.

In the aforementioned portable electronic apparatus, it is preferable that a plurality of indicators is allocated to a surface of the rotary dial portion in predetermined intervals in a rotation direction, respectively.

It is preferable for the aforementioned portable electronic apparatus to be provided with an application determination part, which determines and executes an application corresponding to the indicator identified by rotation of the rotary dial portion; and a device that performs, in a case in which an application determined in the application determination part is a particular application, predetermined processing in the application, wherein a plurality of the particular applications use the device, and wherein, among the plurality of indicators, indicators corresponding to the plurality of particular applications are disposed next to one another on the rotary dial portion.

In the aforementioned portable electronic apparatus, it is preferable that the control part controls the device to be operated in a case in which an application determined by the application determination part is one of the particular of applications.

It is preferable for the aforementioned portable electronic apparatus to be provided with a touch sensor that detects contact to the rotary dial portion, in which, in a case in which the contact to the rotary dial portion is detected by the touch sensor, the control part causes one application among a plurality of applications to enter a state in which activation thereof is possible, based on rotation detected by the rotary dial portion.

In the aforementioned portable electronic apparatus, it is preferable that, after the contact is detected by the touch sensor, the rotation detecting part enters a state in which rotation in the rotary dial portion can be detected.

An object of the present invention is to provide a cellular telephone terminal in which intuitive operations are possible by providing a rotary dial portion.

BRIEF DESCRIPTION OF THE DRAWINGS

FIG. 20 is a table illustrating relationships between the respective symbols allocated to the rotary dial portion and the applications to be activated;

DETAILED DESCRIPTION OF THE INVENTION

Figure 1:
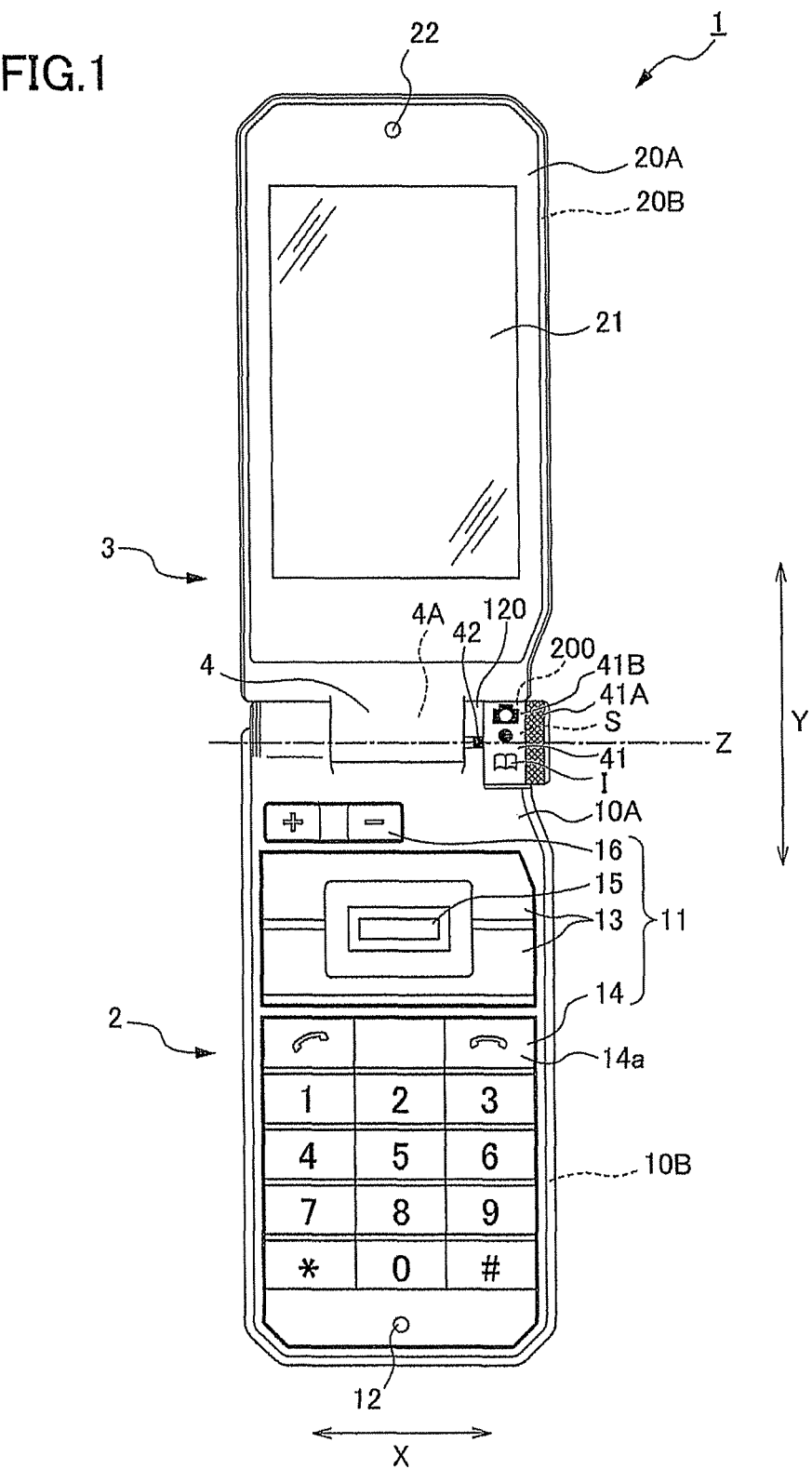
FIG. 1 is a view showing an appearance of a cellular telephone terminal.
Figure 2:
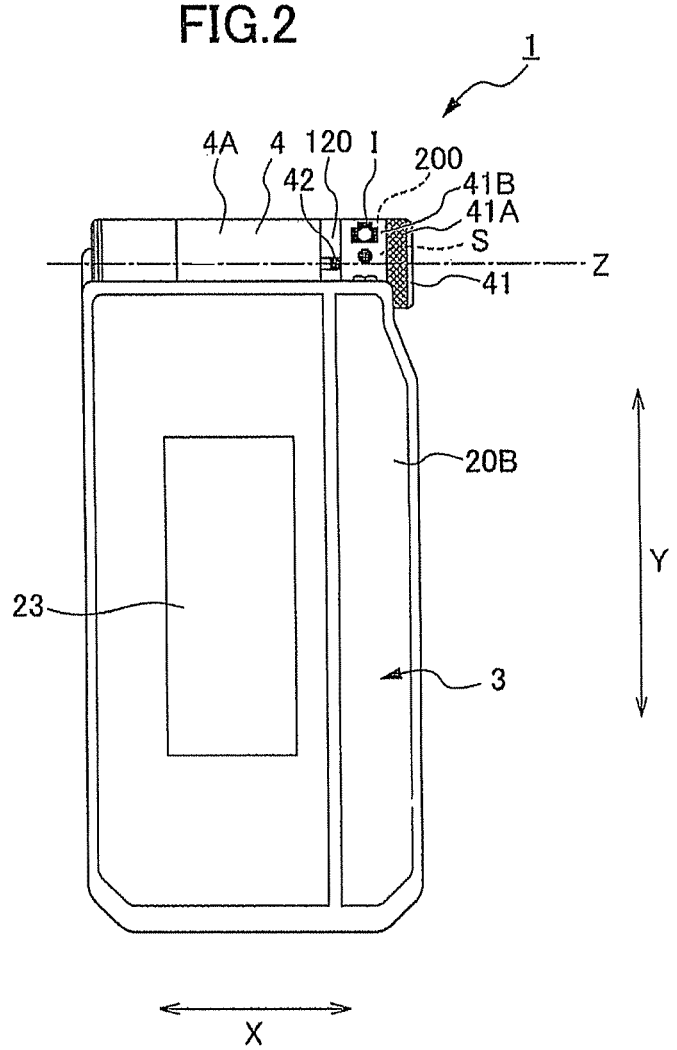
FIG. 2 is a view showing an appearance of the cellular telephone terminal in a closed state, which is viewed from a display part side body.
Figure 3:
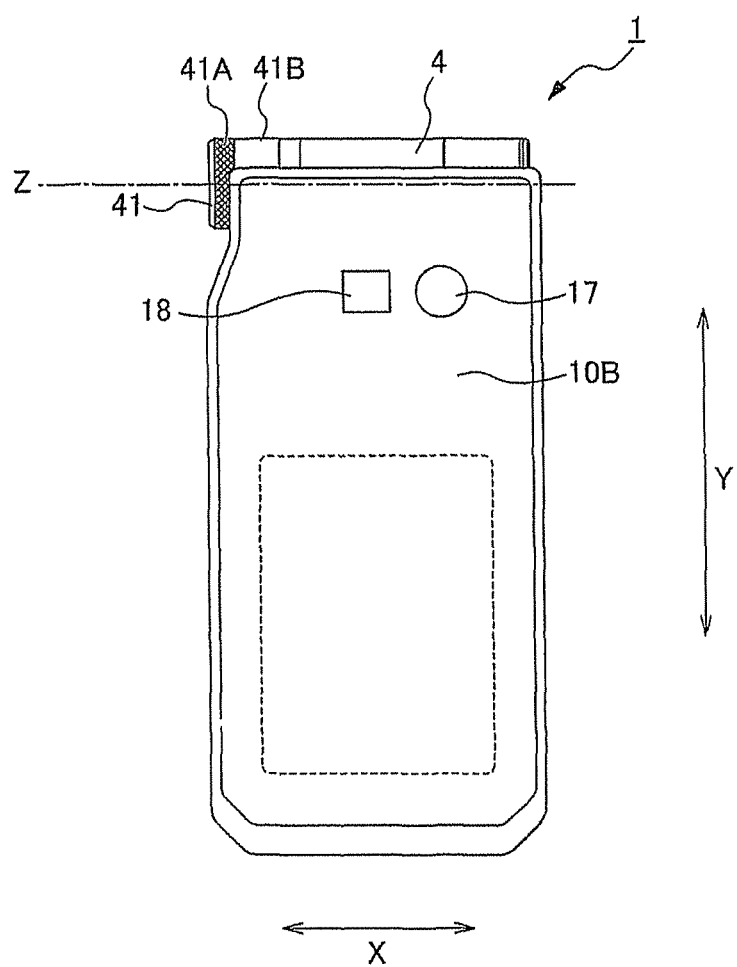
FIG. 3 is a view showing an appearance of the cellular telephone terminal in the closed state, which is viewed from an operation unit side body.
Figure 4:
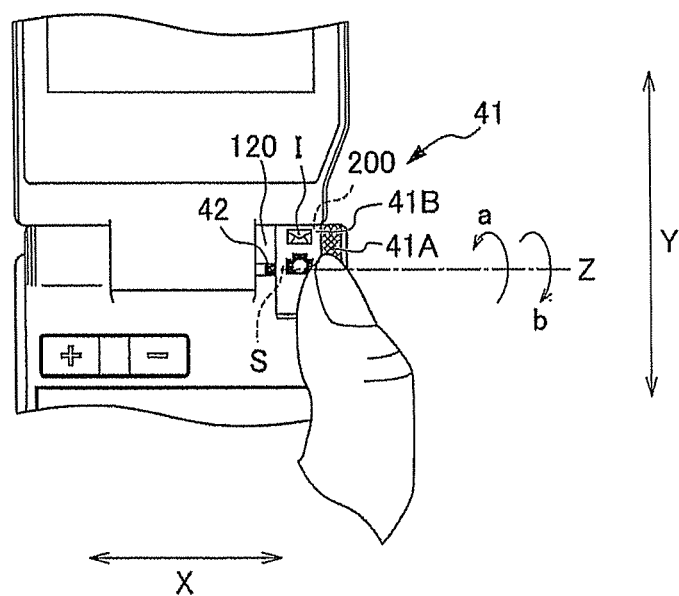
FIG. 4 is a view showing a vicinity of a rotary dial portion in an enlarged manner.
Figure 5:
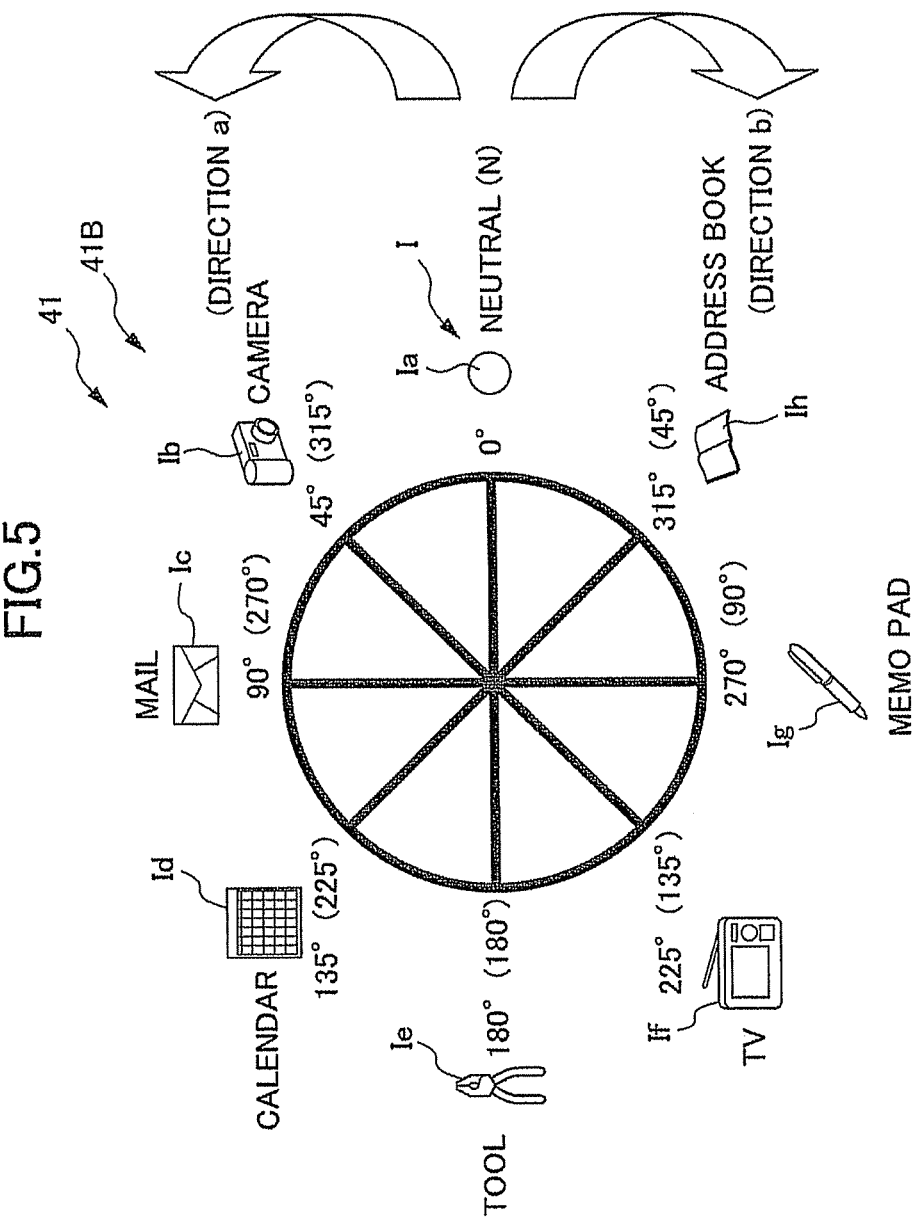
FIG. 5 is a diagram illustrating functions of the rotary dial portion.
Figure 6:
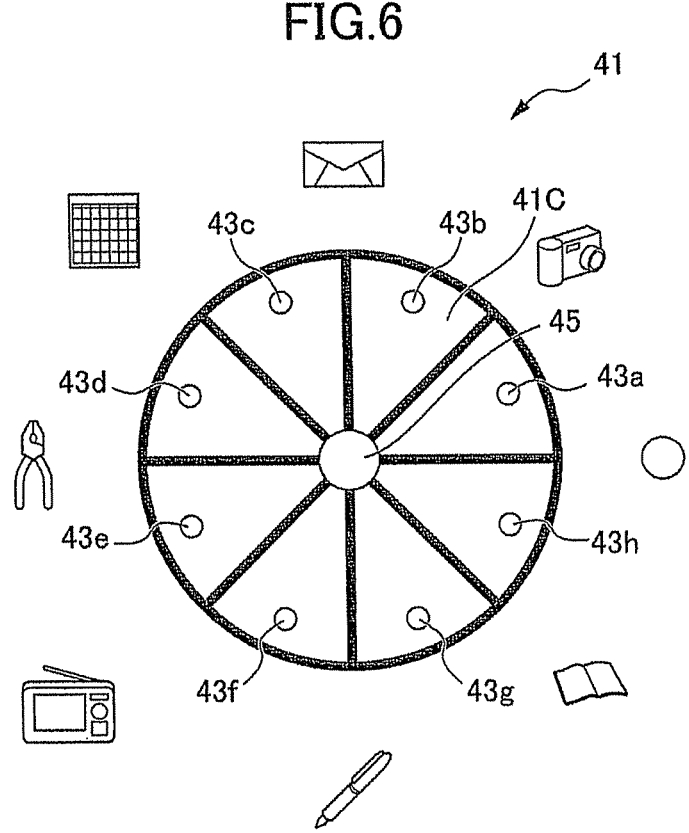
FIG. 6 is a plan view of the rotary dial portion that is viewed from a rear face thereof.
Figure 7:
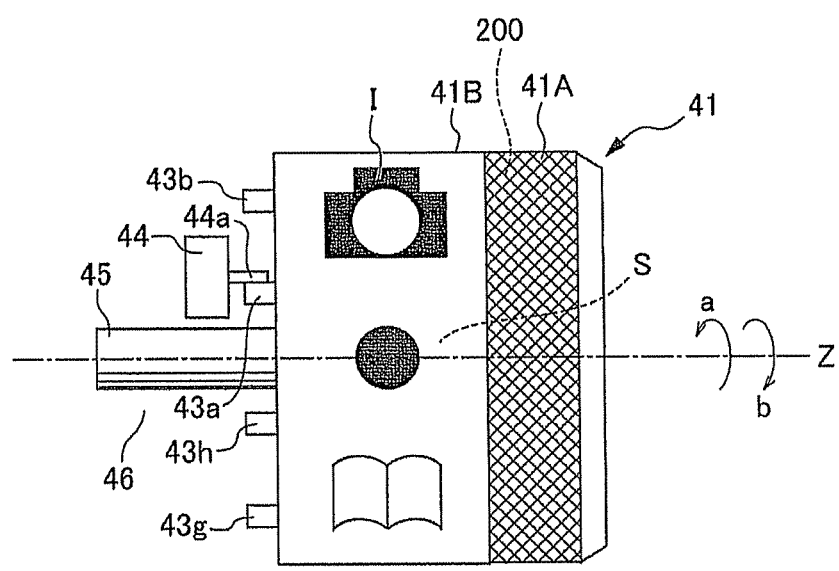
FIG. 7 is a view illustrating a relationship between positional points and a counter portion, which are formed on the rotary dial portion.

Embodiments of the present invention are described hereinafter. First, a configuration of a cellular telephone terminal 1 (as one example of the portable electronic apparatus) is described with reference to FIGS. 1 to 7. FIG. 1 shows an external view of the cellular telephone terminal 1 that is an example of the cellular telephone terminal according to the present invention. In addition, FIG. 2 shows an external view of the cellular telephone terminal 1 in a closed state, which is viewed from a display part side body 3. Furthermore, FIG. 3 shows an external view of the cellular telephone terminal 1 in a closed state, which is viewed from an operation unit side body 2. Moreover, FIG. 4 shows an enlarged view of a vicinity of a rotary dial portion. Additionally, FIG. 5 is a diagram showing functions of the rotary dial portion. FIG. 6 is a plan view of the rotary dial portion which is viewed from a rear face 41C thereof. FIG. 7 is a view illustrating a relationship between positional points 43 and a counter portion 44, which are formed on the rotary dial portion 41.

First Embodiment

As shown in FIG. 1, the cellular telephone terminal 1 is provided with the operation unit side body 2 as a first body piece having a first front surface portion 10A as a first surface, and the display part side body 3 as a second body piece having a second front surface portion 20A as a second surface. An upper end portion of the operation unit side body 2 and a lower end portion of the display part side body 3 are connected via a hinge mechanism 4A, which is disposed in a connecting portion 4, and which is openable and closable around an opening-and-closing axis.

By relatively rotating the operation unit side body 2 and the display part side body 3, which are connected via the hinge mechanism 4A, the cellular telephone terminal 1 is configured so as to be openable and closable around the openingand-closing axis, between an opened state in which the first front surface portion 10A in the operation unit side body 2 and the second front surface portion 20A in the display part side body 3 are separated from each other, and a closed state in which the first front surface portion 10A in the operation unit side body 2 and the second front surface portion 20A in the operation unit side body 2 are adjacently disposed so as to face each other. The opened state and the closed state in the cellular telephone terminal 1 are detected by an opened/closed sensor 300 (refer to FIG. 8) that is configured with a magnet (not shown) disposed in the display part side body 3 and a hall element (not shown) disposed in the operation unit side body 2.

Moreover, the rotary dial portion 41 is disposed to the cellular telephone terminal 1, the rotary dial portion 41 being attached so as to be rotatable around a rotational axis Z that is set to be substantially coaxial with the hinge mechanism 4A.

The connecting portion 4 is configured with a part of the operation unit side body 2 and a part of the display part side body 3. As shown in FIGS. 1 and 2, the part, which constitutes the connecting portion 4, of the operation unit side body 2 has an exposed portion 120 that is exposed externally both in the opened state and in the closed state. A mark 42 is formed to the exposed portion 120 so as to serve as an indicator of rotation amount of the rotary dial portion 41 to be described later. The mark 42 as a mark portion serves as an indicator of the rotation amount of the rotary dial portion 41.

The operation unit side body 2 has the first front surface portion 10A and a first rear surface portion 10B. As shown in FIG. 1, an operation unit 11 that is covered in the closed state and a microphone 12 to which sound of the user is input when conversing are disposed to the first front surface portion 10A in the operation unit side body 2. As shown in FIG. 3, an imaging portion 17, which is configured with a CCD (Charge Coupled Device) camera for taking an image of a subject, and a light-emitting portion 18, which outputs a certain amount of light, are formed on the first rear surface portion 10B in the operation unit side body 2.

The operation unit 11 is configured with: function setting operation keys 13 including keys for operating various settings and various functions (applications) such as an address book function and a mail function, an off-hook key and an on-hook key; input operation keys 14 for inputting telephone numbers, characters and the like in a mail and the like; a selection operation key 15 for performing selections, scrolling and the like in various operations; and a control key 16 for performing volume control and the like.

Here, in addition to the aforementioned function setting operation keys 13, as an operation member for selecting a predetermined function (application), the rotary dial portion 41 to be described later is disposed to the cellular telephone terminal 1.

Moreover, the operation unit side body 2 accommodates: a key structure portion; a key substrate; a casing; a circuit board including a reference potential patterned layer and various electronic components such as an RF (Radio Frequency) module for a cellular phone; an antenna portion; a rechargeable battery 80; and a counter portion 44 (refer to FIG. 7) that is used for detecting the rotation amount in the rotary dial portion 41 to be described later.

A display 21 as a first display part for displaying various information and a sound output unit 22 for outputting sound of the other party of the conversation are disposed on the second front surface 20A in the display part side body 3.

The display 21 displays a communication/call standby image as a top screen. Moreover, the display 21 is configured so as to be capable of displaying a menu image M (refer to FIG. 11) including an image showing contents of the functions. More specifically, the menu image M is displayed on the display 21 in a case in which a touch sensor 200 to be described later detects that an electric conductor such as a finger has touched the rotary dial portion 41.

The menu image M is configured to include an image (including characters) showing the content of the function (application) corresponding to an icon I to be described later that is positioned in a selection position S beside the mark 42. The menu image M is configured to resemble a display aspect of a function indicating portion 41B in the rotary dial portion 41, which is viewed from the operation unit 11 side and the display 21 side in the opened state. In the present embodiment, the menu image M is configured to include names (abbreviations) of the functions corresponding to the applications. The menu image M may be configured to include an image that is similar (e.g., analogous) to the icon I in the function indicating portion 41B. Moreover, the display 21 is configured so as to be capable of displaying an image that is based on an application for operating a predetermined function. It should be noted that the display 21 is disposed in a position that is concealed in the closed state.

Here, the display 21 is configured so as to be capable of displaying an image taken by the imaging portion 17 in a case in which an application for operating a camera function is activated. The display 21 is configured so as to be capable of displaying a list of received E-mails or a mail-creating screen in a case in which an application for operating a mail function is activated. The display 21 is configured so as to be capable of displaying a calendar screen or a schedule screen of each month in a case in which an application for operating a calendar function is activated. The display 21 is configured so as to be capable of displaying an icon showing a plurality of tool functions in a case in which an application for operating the tool functions is activated. The display 21 is configured so as to be capable of displaying an image that is based on a broadcasting signal corresponding to a selected channel among received broadcasting signals in a case in which an application for operating a TV function is activated. The display 21 is configured so as to be capable of displaying an input screen to which characters can be input in a case in which an application for operating a memo pad function is activated. The display 21 is configured so as to be capable of displaying information on a plurality of addresses that are stored in a memory (not shown) in a case in which an application for operating an address book function is activated. It is possible to terminate these applications by depressing the on-hook key (call-end key).

In a case in which the aforementioned applications are terminated, the display 21 displays the communication/call standby screen as the top screen. In addition, a control part 74 to be described later is operating an application capable of using a telephone function. In addition, by depressing the input operation keys 14, to which a function for inputting numbers is assigned, the operation unit 11 accepts input of a telephone number to be called.

As shown in FIG. 2, a sub display 23 for displaying various information is disposed in a position, which is exposed outside even in the closed state, on a second rear surface 20B (a surface opposite to the second front surface portion 20A) in the display part side body 3.

An image that is based on the applications for operating the aforementioned various functions is displayed on the sub display 23 as in the case of the display 21. More specifically, an image that is based on an application is displayed on the display 21 in the opened state, and an image that is based on an application is displayed on the sub display 23 in the closed state.

Since the screen of the sub display 23 is smaller than the screen of the display 21, a part of the image displayed on the display 21 or an analogous (reduced) image is displayed on the sub display 23. Moreover, the sub display 23 is configured so as not to display an image that is based on an application for operating a function, among the various functions, which is not activated when the cellular telephone terminal 1 is in the closed state.

Here, the display 21 and the sub display 23 are respectively configured to have a liquid crystal panel; a drive circuit for driving the liquid crystal panel; and a light source unit such as a back light for irradiating light from the back side of the liquid crystal panel.

The rotary dial portion 41 is disposed so as to be rotatable around the rotational axis Z. More specifically, the rotary dial portion 41 is attached so as to be rotatable around the rotational axis Z that is substantially coaxial with the hinge mechanism 4A, in a width direction X in the connecting portion 4 that is a part of the body. As shown in FIG. 1, the rotary dial portion 41 is disposed such that a rotation operation thereof is possible while viewing the operation unit 11 and the display 21 when the cellular telephone terminal 1 is in the opened state. Moreover, as shown in FIG. 2, the rotary dial portion 41 is disposed such that a rotation operation thereof is possible while viewing the sub display 23 when the cellular telephone terminal 1 is in the closed state.

The rotary dial portion 41 is provided with an abutting portion 41A and the function indicating portion 41B.

The abutting portion 41A is a side face of the rotary dial portion 41, and is formed on a portion that is positioned to the edge side in the width direction X in a state in which the rotary dial portion 41 is attached. The abutting portion 41A is configured such that concavities and convexities are formed on the surface thereof, whereby the rotation operation of the rotary dial portion 41 is facilitated.

The function indicating portion 41B is a side face of the rotary dial portion 41, and is formed on a portion that is positioned in the center in the width direction X in a state in which the rotary dial portion 41 is attached. The icons I (indicator), which are symbols or pictures representing the functions, are depicted on the surface of the function indicating portion 41B. As shown in FIG. 5, an icon I representing a function is depicted in a position at every predetermined angle (e.g., 45 degrees) in the rotation direction of the function indicating portion 41B.

More specifically, a balloon icon Ia representing neutral as a standard position is depicted on the function indicating portion 41B. In addition, a camera icon Ib, which represents the camera function, and which is formed at a position of 45 degrees (angle in the rotary direction a in a case in which neutral is set as the standard, and the same applies to angles in the following), is depicted on the function indicating portion 41B. Furthermore, a letter icon Ic, which represents the mail function, and which is formed at a position of 90 degrees, is depicted on the function indicating portion 41B. Moreover, a calendar icon Id, which represents the calendar function, and which is formed at a position of 135 degrees, is depicted on the function indicating portion 41B. Additionally, a tool icon Ie, which represents the tool function, and which is formed at a position of 180 degrees, is depicted on the function indicating portion 41B. Moreover, a television icon If, which represents the TV function, and which is formed at a position of 225 degrees, is depicted on the function indicating portion 41B. In addition, a pen icon Ig, which represents the memo pad function, and which is formed at a position of 270 degrees, is depicted on the function indicating portion 41B. Furthermore, a notebook icon Ih, which represents the address book function, and which is formed at a position of 315 degrees, is depicted on the function indicating portion 41B.

The function indicating portion 41B is rotated with rotation of the abutting portion 41A to which a rotation operation is applied. The icon I, which is depicted on the side of the operation unit 11 and the display 21 of the cellular telephone terminal 1 in the opened state, is changed with rotation of the abutting portion 41A. Furthermore, the icon I, which is positioned in the selection position S beside the mark 42 in the width direction X, is changed with the rotation of the rotary dial portion 41, in which the mark 42 is on the outer surface of the connecting portion 4 and is formed at a position facing the side of the operation unit 11 and the display 21 when the cellular telephone terminal 1 is in the opened state. The icon I that is positioned on the selection position S is determined by the rotation amount of the rotary dial portion 41. In the present embodiment, the rotation position refers to a rotation amount relative to the standard position.

Here, in the present embodiment, the standard position refers to a state in which the balloon icon Ia on the function indicating portion 41B is positioned in the selection position S.

To the connecting portion 4 side in the rotary dial portion 41, a rotary shaft member 45 is formed, which is inserted into an insertion portion (not shown) formed in the connecting portion 4. As shown in FIG. 6, protruding positional points 43a to 43h are formed along a circumferential direction (rotation direction) on a rear face 41C that is a surface of the rotary dial portion 41 to the side of the connecting portion 4. The positional points 43a to 43h are formed at predetermined intervals in the circumferential direction. The positional points 43a to 43h are formed in the intervals between the icons I representing the respective functions in the circumferential direction.

The counter portion 44 is disposed to the connecting portion 4, such that a tongue 44a of the counter portion 44 is positioned in a movement locus of the positional points 43a to 43h in a state in which the rotary dial portion 41 is rotated.

The counter portion 44 counts the number of the positional points 43a to 43h which have passed the tongue 44a by the movement in the rotation direction. More specifically, the count number is added in a case in which the tongue 44a is tilted toward the rotation direction a, and the count number is subtracted in a case in which the tongue 44a is tilted toward the rotation direction b. A rotation detecting part 72 to be described later (refer to FIG. 9) detects the rotation amount in the rotary dial portion 41 in accordance with the count number relative to the standard position, a result of which makes it possible to identify the rotation position.

The rotary dial portion 41 is attached to the operation unit side body 2 such that the rotational axis Z is coaxial with the opening-and-closing axis of the hinge mechanism 4A. The rotary dial portion 41 is attached at a position that is adjacent to the exposed portion 120 in the operation unit side body 2. In other words, the rotary dial portion 41 is disposed to be adjacent to the mark 42 that is disposed to the exposed portion 120.

Furthermore, the rotary dial portion 41 is configured with a metal member having electrical conductivity or a resin member that has been treated so as to have electrical conductivity.

The touch sensor 200, which detects contact to the rotary dial portion 41, is disposed inside the rotary dial portion 41. The touch sensor 200 (touch sensor detecting part 71) detects contact to the rotary dial portion 41 by way of a change in electrostatic capacitance arising from the finger of the user's contact on the rotary dial portion 41.

Detection of contact to the rotary dial portion 41 by the touch sensor 200 (touch sensor detecting part 71) serves as a trigger for the rotation detecting part 72 and the control part 74.

More specifically, in a case in which the touch sensor 200 detects contact to the rotary dial portion 41, the rotation detecting part 72 to be described later (refer to FIG. 9) enters a state in which the rotation amount in the rotary dial portion 41 can be detected. The rotation detecting part 72 detects a rotation amount of the rotary dial portion 41 in a state in which contact has been detected by the touch sensor 200. Based upon the rotation amount detected by the rotary dial portion 41, the control part 74 to be described later causes one of a plurality of applications to enter a state in which activation thereof is possible.

In this case, a menu image M is displayed on the display 21 to notify that the rotation detecting part 72 has entered a state in which the rotation amount of the rotary dial portion 41 can be detected, and that the content of the selected application is in a state in which activation thereof is now possible. As described later, it is configured to make it possible to display the menu image M including an image (characters), which shows the contents of the application that can be activated (refer to FIG. 12).

Moreover, in a case in which the contact to the rotary dial portion 41 ceases being detected by the touch sensor 200 (touch sensor detecting part 71), the control part 74 activates one application that can be activated. More specifically, after a predetermined time has elapsed since the contact to the rotary dial portion 41 ceased being detected by the touch sensor 200 (touch sensor detecting part 71), the control part 74 activates the one application that can be activated at the time when the contact ceased being detected.

Here, operations and functions of the rotary dial portion 41 are described. As shown in FIG. 4, the rotary dial portion 41 is attached to the connecting portion 4 in the bodies such that the rotary dial portion 41 is rotated by a force in the rotation directions (the rotation direction a and the rotation direction b in FIG. 4) applied by the user's finger to the abutting portion 41A. As described above, the icons I (icons Ia to Ih) are allocated on the rotary dial portion 41 at predetermined intervals in the rotation direction. As shown in FIG. 5, the icons I are represented by symbols and pictures that are easy for the user to understand when selecting an application.

The user enters a preparatory state for rotating the rotate rotary dial portion 41 by putting a finger on the abutting portion 41A in the rotary dial portion 41. In this case, since a change occurs in the electrostatic capacitance in the rotary dial portion 41, the touch sensor 200 detects the contact to the rotary dial portion 41. As a result, the rotation detecting part 72 to be described later enters a state in which the rotation amount of the rotary dial portion 41 can be detected.

The user then moves an icon I corresponding to a desired function (application) to the selection position S by using the icons I as clues. In this way, the control part 74 causes an application, which operates a function corresponding to the icon I positioned in the selection position S, to enter a state in which activation thereof is possible.

In a state in which the icon I, which corresponds to the application for operating the desired function, is positioned in the selection position S, the user disengages the finger that has been placed on the abutting portion 41A. After a predetermined time has elapsed since the user's finger disengaged from the abutting portion 41A, and the contact ceases being detected by the touch sensor 200, the control part 74 activates one application that is in a state in which activation thereof is possible, based upon the rotation position that is identified at the time when the contact ceased being detected by the touch sensor 200. In this way, the rotary dial portion 41 makes it possible to select menus for achieving various functions by the operation of the physical rotary dial.

More specifically, as shown in FIG. 5, the rotary dial portion 41 is rotated 45 degrees in the rotation direction a (315 degrees in the rotation direction b)±22.5 degrees relative to the non-operation time (neutral (N)) by the user's rotation operation, thereby causing the application for operating the camera function of the imaging portion 17 to enter a state in which activation thereof is possible. After a predetermined time (e.g., 2 to 3 seconds) has elapsed since the user's finger is disengaged from the rotary dial portion 41, the application for operating the camera function of the imaging portion 17 is activated.

Moreover, the rotary dial portion 41 is rotated 90 degrees in the rotation direction a (270 degrees in the rotation direction b)±22.5 degrees by the user's rotation operation, thereby causing the application for operating the mail function to enter a state in which activation thereof is possible. After a predetermined time (e.g., 2 to 3 seconds) has elapsed since the user's finger is disengaged from the rotary dial portion 41, the application for operating the mail function is activated.

Moreover, the rotary dial portion 41 is rotated 135 degrees in the rotation direction a (225 degrees in the rotation direction b)±22.5 degrees by the user's rotation operation, thereby causing the application for operating the calendar function to enter a state in which activation thereof is possible. After a predetermined time (e.g., 2 to 3 seconds) has elapsed since the user's finger is disengaged from the rotary dial portion 41, the application for operating the calendar function is activated.

Moreover, the rotary dial portion 41 is rotated 180 degrees in the rotation direction a (180 degrees in the rotation direction b)±22.5 degrees by the user's rotation operation, thereby causing the application for operating the tool menu (menu for performing various settings regarding a sound output and the like in the cellular telephone terminal 1) to enter a state in which activation thereof is possible. After a predetermined time (e.g., 2 to 3 seconds) has elapsed since the user's finger disengaged from the rotary dial portion 41, the application for operating the tool menu (menu for performing various settings regarding the sound output and the like in the cellular telephone terminal 1) is activated.

Moreover, by rotating the rotary dial portion 41 225 degrees in the rotation direction a (135 degrees in the rotation direction b)±22.5 degrees according to the user's rotation operation, the application for operating the television function enters a state in which activation thereof is possible. After a predetermined time (e.g., 2 to 3 seconds) has elapsed since the user's finger is disengaged from the rotary dial portion 41, the application for operating the television function is activated.

Moreover, by rotating the rotary dial portion 41 270 degrees in the rotation direction a (90 degrees in the rotation direction b)±22.5 degrees according to the user's rotation operation, the application for operating the memo pad function enters a state in which activation thereof is possible. After a predetermined time (e.g., 2 to 3 seconds) has elapsed since the user's finger is disengaged from the rotary dial portion 41, the application for operating the memo pad function is activated.

Moreover, by rotating the rotary dial portion 41 315 degrees in the rotation direction a (45 degrees in the rotation direction b)±22.5 degrees according to the user's rotation operation, the application for operating the address book function enters a state in which activation thereof is possible. After a predetermined time (e.g., 2 to 3 seconds) has elapsed since the user's finger is disengaged from the rotary dial portion 41, the application for operating the address book function is activated.

Here, the present embodiment may be configured such that the applications which can be activated are more limited when the cellular telephone terminal 1 is in the closed state than in the opened state. More specifically, the cellular telephone terminal 1 is configured such that only one or a plurality of limited applications can be activated, among the applications that can be activated, in the opened state. Here, for example, the rotary dial portion 41 may be configured such that the rotation is restricted to the rotation positions corresponding to the applications that can be activated in the closed state.

Two methods can be considered as methods for restricting applications that are activated in the closed state in this way.

Firstly, there is a case of a structural restriction.

The rotary dial portion 41 may be configured such that the rotatable range thereof is restricted in the closed state, and the icons I corresponding to the application programs to be restricted may be allocated to the rotation positions to be restricted, in allocating the icons (indicator) to the rotary dial portion 41. When transitioning from the opened state to the closed state, the rotation of the rotary dial portion 41 is restricted by movement and the like of a cam (not shown) in the hinge, a result of which the user cannot perform rotation to the icon of the application program to be restricted. This makes it possible to partly restrict the application programs in the closed state.

Secondly, there is also a case of restriction by software.

A restriction table, which serves to recognize whether activation is possible or restricted in the closed state for each application program, is stored in a memory unit 100 in advance. When rotation of the rotary dial portion 41 is detected in the closed state, the control part 74 identifies whether the application program corresponding to the identified rotation position can be activated, by referring to the restriction table. In a case in which it is to be restricted, the application program is not activated, and the state before the rotation occurred is maintained, and in a case in which activation is possible, the corresponding application program is activated. This makes it possible to partly restrict the application programs in the closed state. As the application programs to be restricted, the tool menu, the Internet connection and the like are preferable, which are not used or not suitable in the closed state.

A mark 42 is formed on a portion that is a part of the operation unit side body 2 and constitutes the connecting portion 4. More specifically, the mark 42 is formed on the exposed portion 120 in the connecting portion 4. The mark 42 is exposed so as to be visible from the outside both in the opened state and in the closed state of the cellular telephone terminal 1. In other words, the mark 42, which indicates one of the plurality of indicators (icons I), is disposed at a position that is exposed both in the opened state and in the closed state.

Moreover, the rotary dial portion 41 is similarly exposed so as to be visible from the outside both in the opened state and in the closed state. This makes it possible for the user to visually confirm the mark 42 and the icon I that is positioned in the selection position S beside the mark 42, from the outside in the opened state and the closed state. Moreover, the user can change the functions while viewing the mark 42 and the icon I, which is positioned in the selection position S beside the mark 42, from the outside in the opened state and the closed state.

Next, a functional configuration in the cellular telephone terminal 1 is described with reference to FIGS. 8 and 9.

Figure 8:
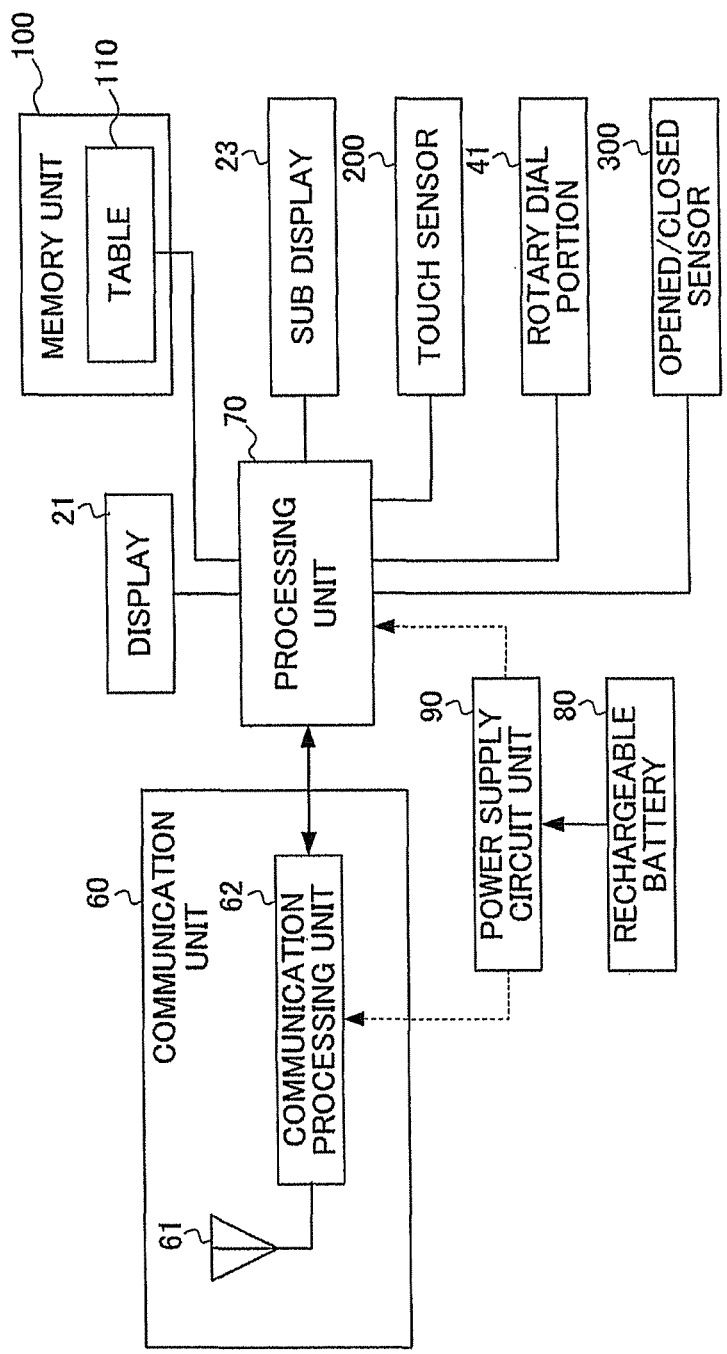
FIG. 8 is a functional block diagram showing functions of the cellular telephone terminal.
Figure 9:
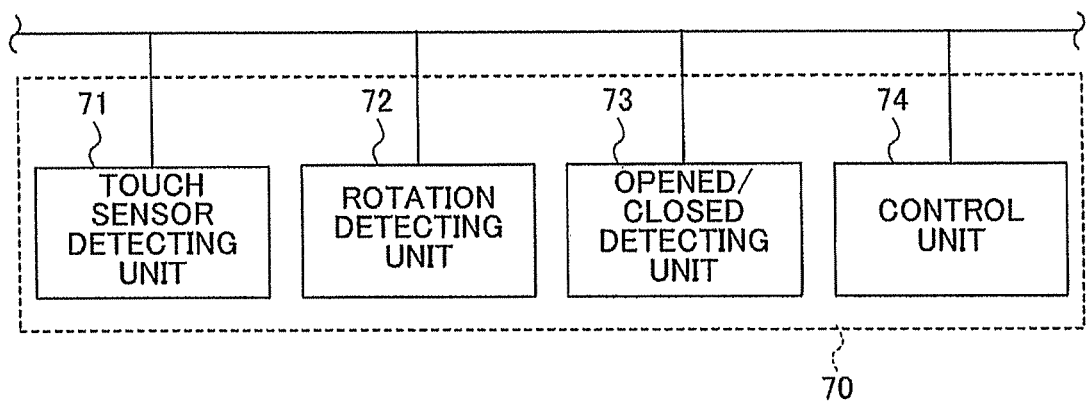
FIG. 9 is a functional block diagram in a processing unit.

FIG. 8 is a functional block diagram showing functions of the cellular telephone terminal 1. FIG. 9 is a functional block diagram in a processing unit 70.

As shown in FIG. 8, the cellular telephone terminal 1 is provided with: the display 21 that displays predetermined information; the sub display 23 that displays predetermined information; the rotary dial portion 41 that is rotated by the user's operation; the touch sensor 200; a communication unit 60 that performs communications with external terminals; the processing unit 70 that performs predetermined processing; the rechargeable battery 80 having a predetermined capacity; a power supply circuit unit 90, which converts a power supply voltage supplied from the rechargeable battery 80 into a predetermined voltage, and which feeds the converted voltage to the communication unit 60, the processing unit 70 and the like; and the memory unit 100.

The communication unit 60 is provided with: a main antenna 61 that performs communication with an external device at a predetermined frequency band to be used; and a communication processing unit 62 that performs signal processing such as modulation processing or demodulation processing.

The main antenna 61 performs communication with the external device (base station) at a predetermined frequency band to be used (e.g., 800 MHz). It should be noted that, although a predetermined frequency band to be used is 800 MHz in the present embodiment, another frequency band may be used. Moreover, in addition to the predetermined frequency band to be used, the main antenna 61 may be configured with a so-called dual band adaptive type that is adaptive to a second frequency band to be used (e.g., 2 GHz), and furthermore, it may be configured with a multiple band adaptive type that is adaptive to a third frequency band to be used.

The communication processing unit 62 applies demodulation processing to signals received by the main antenna 61, and feeds the processed signals to the processing unit 70, while the communication processing unit 62 applies modulation processing to signals supplied from the processing unit 70, and transmits the signals to the external device (base station) through the main antenna 61.

The power supply circuit unit 90 transforms a power supply voltage, which is supplied from the rechargeable battery 80, to a predetermined voltage value, and supplies the transformed voltage to the communication unit 60, the processing unit 70 and the like.

The memory unit 100 stores a number of programs that are executed by the processing unit 70, parameters, various tables and the like. More specifically, the memory unit 100 stores: a number of application programs, of which activation, termination, interruption and the like are performed by the control part 74; parameters that are used by the plurality of applications; an OS program for operating the plurality of application programs; and a table 100 that indicates the corresponding relationship between the rotation amount (count number) detected by the rotation detecting part 72 and the plurality of applications (refer to FIG. 5).

It should be noted that the plurality of application programs include application programs for each application that the cellular telephone terminal 1 has, such as a standard application, a music player, a camera and mail.

The processing unit 70 performs activation processing for various functions in accordance with the rotation amount that is supplied from the rotary dial portion 41.

Here, a configuration and operations of the processing unit 70 are described. As shown in FIG. 9, the processing unit 70 is provided with: the touch sensor detecting part 71 that detects contact by an electric conductor (e.g., a finger of the user) to the rotary dial portion 41; the rotation detecting part 72 that detects the rotation amount of the rotary dial portion 41; an opened/closed detecting part 73 that detects the opened state and the closed state of the cellular telephone terminal 1; and the control part 74 that controls such that a predetermined application, which operates a function corresponding to the rotation amount detected by the rotation detecting part 72, is activated, and a display screen corresponding to the activated predetermined application is displayed on the display 21 or the sub display 23.

The touch sensor detecting part 71 detects whether a predetermined electric conductor is touching the rotary dial portion 41, by way of a change in electrostatic capacitance detected by the touch sensor 200 disposed inside the rotary dial portion 41. In a case in which, based on the change in electrostatic capacitance detected by the touch sensor 200, it is detected that the predetermined electric conductor is touching the rotary dial portion 41, the touch sensor detecting part 71 outputs a detection signal to the rotation detecting part 72 and the control part 74.

By receiving the detection signal from the touch sensor detecting part 71, the rotation detecting part 72 enters a state in which the rotation amount in the rotary dial portion 41 can be detected.

As described above, the rotation detecting part 72 detects the rotation amount in the rotary dial portion 41 by the number of the positional points 43a to 43h counted by the counter portion 44. For example, in a case in which the rotation direction a is referred to as plus (+), and the count number of the positional points in the counter portion 44 is "+1," the rotation detecting part 72 detects that the rotation amount is from 22.5 degrees to 67.5 degrees. Moreover, in a case in which the count number of the positional points in the counter portion 44 does not change for a certain duration (e.g., 1 to 2 seconds), the rotation detecting part 72 notifies the control part 74 of the rotation amount. The rotation position is identified by this.

Here, the rotation detecting part 72 is maintained in a state in which the rotation amount in the rotary dial portion 41 can be detected, until the time when the detection signal ceased being received from the touch sensor detecting part 71.

The opened/closed detecting part 73 detects whether the cellular telephone terminal 1 is in the opened state or in the closed state, based on the signal that is output from the aforementioned opened/closed sensor 300. In a case in which it is detected that the cellular telephone terminal 1 is in the closed state, the opened/closed detecting part 73 outputs a detection signal to the control part 74.

By receiving the detection signal from the touch sensor detecting part 71, the control part 74 causes one application among the plurality of applications, which corresponds to the rotation amount detected by the rotation detecting part 72, to enter a state in which activation thereof is possible.

Moreover, after a predetermined time has elapsed since the user disengages a finger from the rotary dial portion 41, the control part 74 activates the application in a state in which activation thereof is possible. More specifically, after a predetermined time has elapsed since the detection signal ceased being received from the touch sensor detecting part 71, the control part 74 activates an application in a state in which activation thereof is possible, in accordance with the rotation amount detected by the rotation detecting part 72 at the time when the detection signal ceased being received. When the rotation amount is detected by the rotation detecting part 72, the control part 74 activates a predetermined application corresponding to an indicator (icon I) indicated by the mark 42 among the plurality of indicators (icons I).

Moreover, in a case in which the touch sensor detecting part 71 detects, by change in electrostatic capacitance, that an electric conductor has touched the rotary dial portion 4, the control part 74 displays, on the display 21, the menu image (screen) M including an image representing an application in a state in which activation thereof is possible. More specifically, by receiving the detection signal from the touch sensor detecting part 71, the control part 74 displays, on the display 21, the menu image M including the image representing the application in a state in which activation thereof is possible, based on the rotation amount detected by the rotation detecting part 72 (refer to FIG. 11).

Here, the menu image M also has a function for indicating that the rotation detecting part 72 has entered a state in which the rotation amount in the rotary dial portion 41 can be detected. In other words, the menu image M is displayed on the display 21, thereby allowing the user to know that it is presently in a state in which an application is selectable by the rotary dial portion 41.

The control part 74 refers to the table 110 for the application correspondence relationship in the memory unit 100 every time rotation of the rotary dial portion 41 occurs, and identifies an application corresponding to the rotation amount (count number).

When the power supply of the cellular telephone terminal 1 is turned on, the control part 74 firstly stars up the OS program, and activates the standard application program under the control of the OS, thereby making it possible to display a standby screen on the display 21. Subsequently, every time an application to be activated arises, a new application program is activated by terminating or interrupting the standard application program under the control of the OS. By this processing, the control part 74 displays a screen based on the newly activated application in place of the standby screen on the display 21.

It should be noted that, when a call-end key (on-hook key) included in the input operation keys 14 is operated, the standard application program is activated again after terminating the application that had been running under the control of the OS. The control part 74 causes the display to transition from the screen of the terminated application to the standby screen.

More specifically, as shown in FIG. 4, the rotary dial portion 41 is rotationally moved such that the icon representing the camera function is positioned beside the mark 42 (the selection position S), and thereafter the finger is disengaged from the rotary dial portion 41. After a predetermined time has elapsed since the finger disengaged from the rotary dial portion 41, the control part 74, for example, refers to the table 110, activates the application for operating the camera function assigned to the relevant rotation amount (from 22.5 degrees to 67.5 degrees), and activates the imaging portion 17.

Moreover, the control part 74 displays an image based on the application for operating the camera function on the display 21. More specifically, an image of the subject that can be taken via the imaging portion 17 is displayed on the display 21.

In a case in which the count number of the positional points in the counter portion 44 has changed during a certain duration (e.g., 1 to 2 seconds) after the predetermined rotation amount is detected by the rotation detecting part 72, the control part 74 maintains the activated state of the application that had been activated before the rotary dial portion 41 is rotated.

Moreover, in a case in which the number of the positional points 43*a* to 43*h* counted by the rotation detecting part 72 is "0 (zero)" as a result, the control part 74 maintains the activated state of the application that has been operated before the rotary dial portion 41 is rotated.

Here, in a case in which the cellular telephone terminal 1 is in the closed state, the control part 74 restricts the applications that can be activated, as compared to the case in the opened state. More specifically, the control part 74 makes it possible to activate only one or a plurality of limited applications among the applications that can be activated in the opened state. In other words, in a case in which a detection signal is received from the opened/closed detecting part 73, the control part 74 can activate only one or a plurality of limited applications among the applications that can be activated in the opened state. For example, the functions and the like that can not be operated by the user in the closed state are restricted.

Moreover, in a case in which the cellular telephone terminal 1 is in the opened state, the control part 74 outputs an image based on the activated application on the display 21, and in a case in which the cellular telephone terminal 1 is in the closed state, the control part 74 displays an image based on the activated application on the sub display 23. The control part 74 similarly displays the aforementioned menu image M on the display 21 or the sub display 23 in accordance with the opened state or the closed state. Here, the menu image M1 that is displayed on the sub display 23 is configured to include only an image (including characters) representing an application (function) that can be activated in the closed state.

Next, operations of the cellular telephone terminal 1 in the present embodiment are described with reference to FIGS. 10 to 12.

Figure 10:
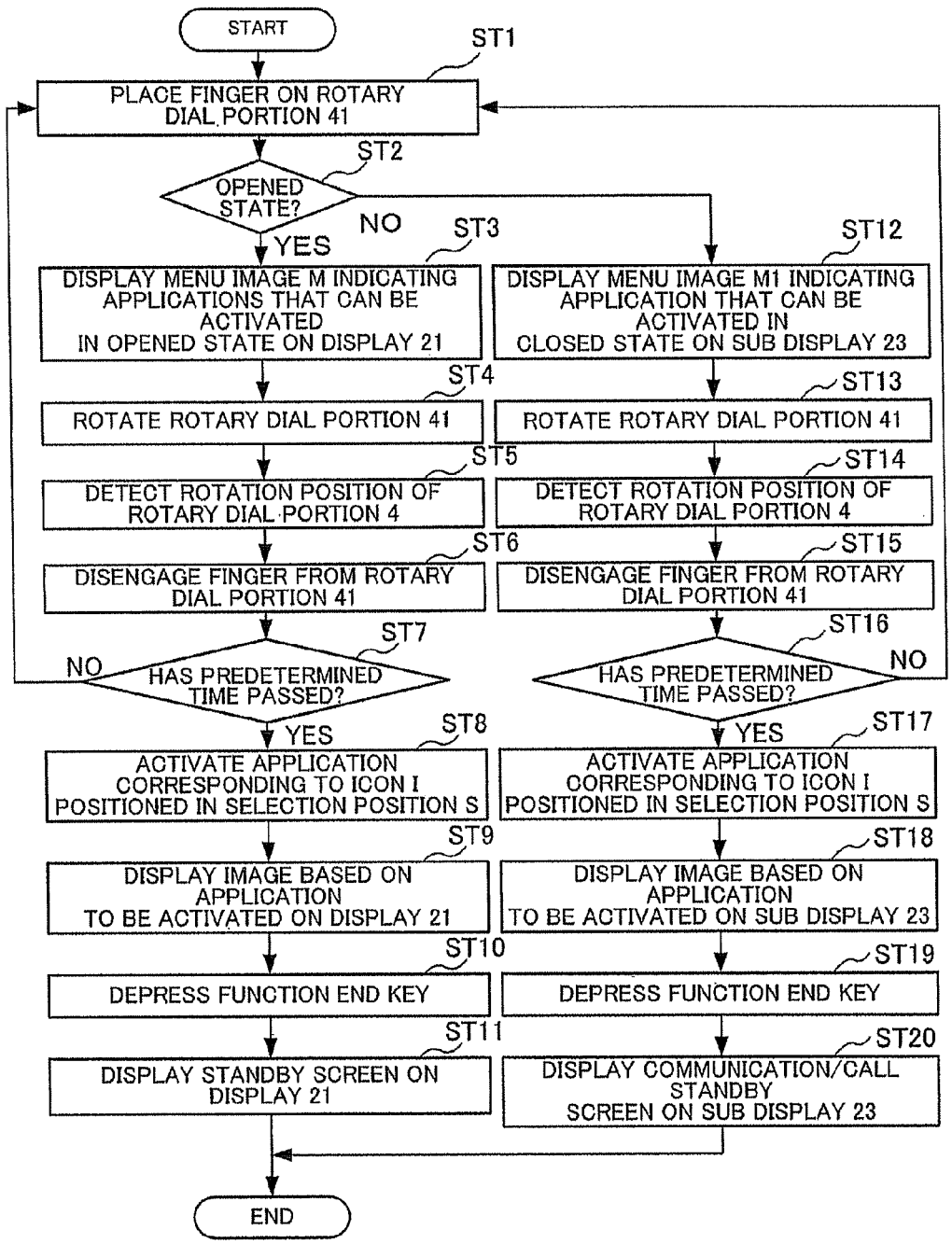
FIG. 10 is a flowchart illustrating operations of the cellular telephone terminal.
Figure 11:
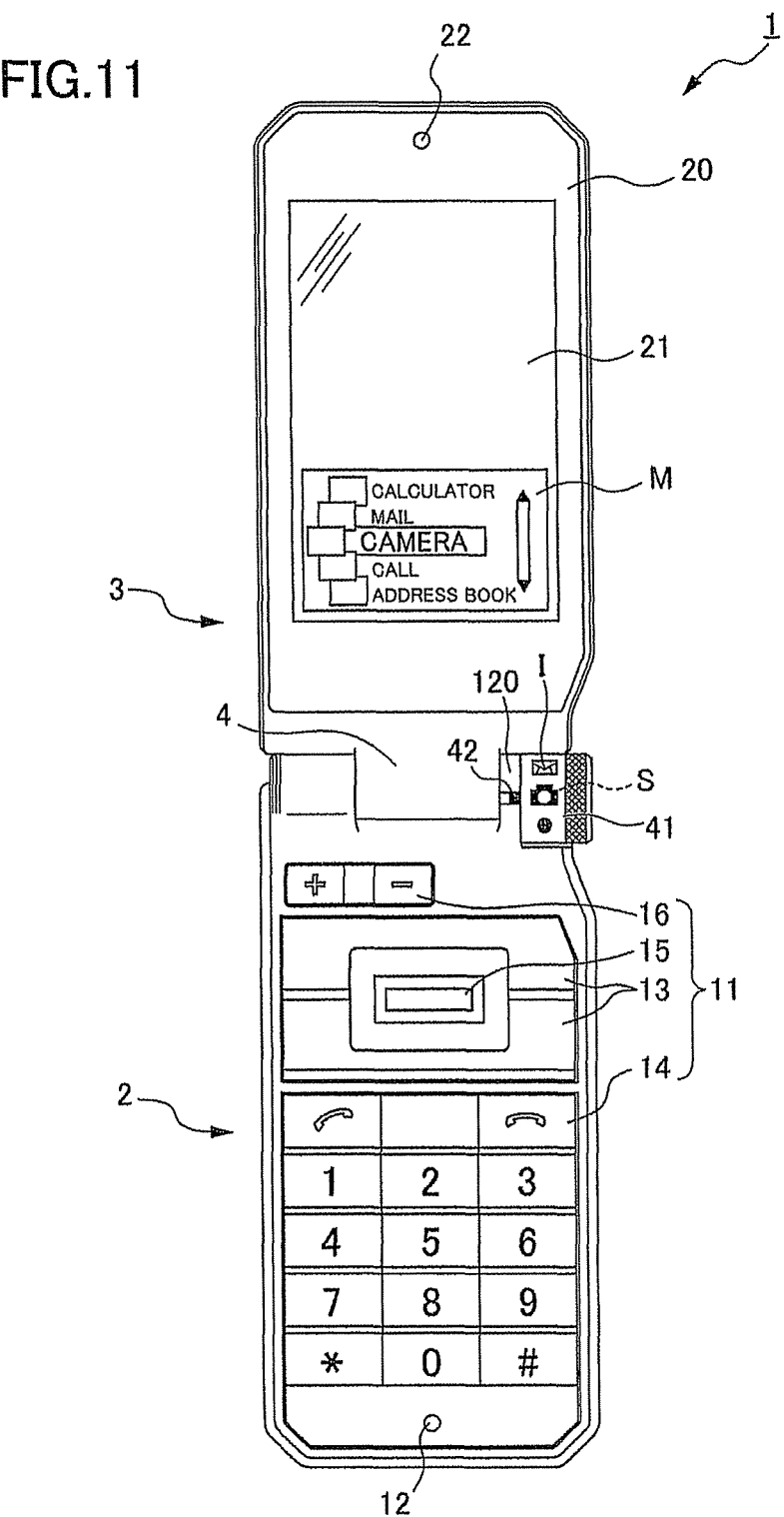
FIG. 11 is a view illustrating a menu image M that is displayed on a display in an opened state.

FIG. 10 is a flowchart illustrating operations of the cellular telephone terminal 1. FIG. 11 is a view illustrating the menu image M in the opened state. FIG. 12 is a view illustrating the menu image M1 in the closed state.

The user puts a finger on the abutting portion 41A in the rotary dial portion 41 in order to rotate the rotate rotary dial portion 41 (ST1). The touch sensor 200 detects a change in electrostatic capacitance in the rotary dial portion 41. As a result, the touch sensor detecting part 71 detects that the finger as an electric conductor has touched the rotary dial portion 41. The touch sensor detecting part 71 then outputs a detection signal to the rotation detecting part 72 and the control part 74. By receiving the detection signal, the rotation detecting part 72 enters a state in which the rotation amount in the rotary dial portion 41 can be detected.

The opened/closed detecting part 73 detects whether the cellular telephone terminal 1 is in the opened state or the closed state. As shown in FIG. 11, in a case in which the cellular telephone terminal 1 is in the opened state (ST2), the control part 74 displays the menu image M including images representing applications that can be activated in the opened state on the display 21 (ST3). By displaying the menu image M on the display 21, the cellular telephone terminal 1 notifies the user that the functions (applications) have become selectable by the rotary dial portion 41, and assists the user's selection operations as an indication for selecting the functions.

The user rotationally moves the rotary dial portion 41 such that an icon I representing a predetermined function is positioned in the selection position S, by using the mark 42, which is exposed in the opened state, as an indicator of the selection position S (ST4).

The rotation detecting part 72, which is in a state in which the rotation amount of the rotary dial portion 41 can be detected, detects the rotation amount in the rotary dial portion 41 that has been rotated by the user (ST5). The display contents of the menu image M that is displayed on the display 21 are correspondingly changed to the rotation amount in the rotary dial portion 41.

When the user disengages the finger from the rotary dial portion 41 after selecting a desired application by viewing the menu image M displayed on the display 21, the touch sensor 200 further detects a change in the electrostatic capacitance (ST6). After a predetermined time has elapsed since the finger disengaged from the rotary dial portion 41 (i.e. since the electrostatic capacitance changed) (ST7), the control part 74 activates an application corresponding to the icon I positioned in the selection position S (ST8). More specifically, the control part 74 activates the application for operating the function that has been correspondingly assigned to the rotation position identified by the rotation amount detected by the rotation detecting part 72.

In a case in which the user's finger is placed on the rotary dial portion 41 again before the predetermined time has elapsed since the finger disengaged from the rotary dial portion 41 (ST8), the control part 74 does not activate an application (ST1).

The control part 74 displays an image based on the application to be activated on the display 21 (ST9). In a case in which the finger is disengaged from the rotary dial portion 41 in a state shown in FIG. 11, the control part 74 activates the application for operating the camera function. The control part 74 then displays an image based on the activated application on the display 21. For example, it is possible to display, as the image based on the application for operating the camera function, the image of the subject that can be taken via the imaging portion 17, on the display 21.

Subsequently, the user depresses a function end key (e.g., the call-end key, the on-hook key), thereby terminating the activated application (ST11).

In a case in which the function end key is depressed, and the application that had been activated is terminated, for example, the display regarding the camera function is terminated, and the communication/call standby screen as the top screen is displayed on the display 21 (ST11).

Figure 12:
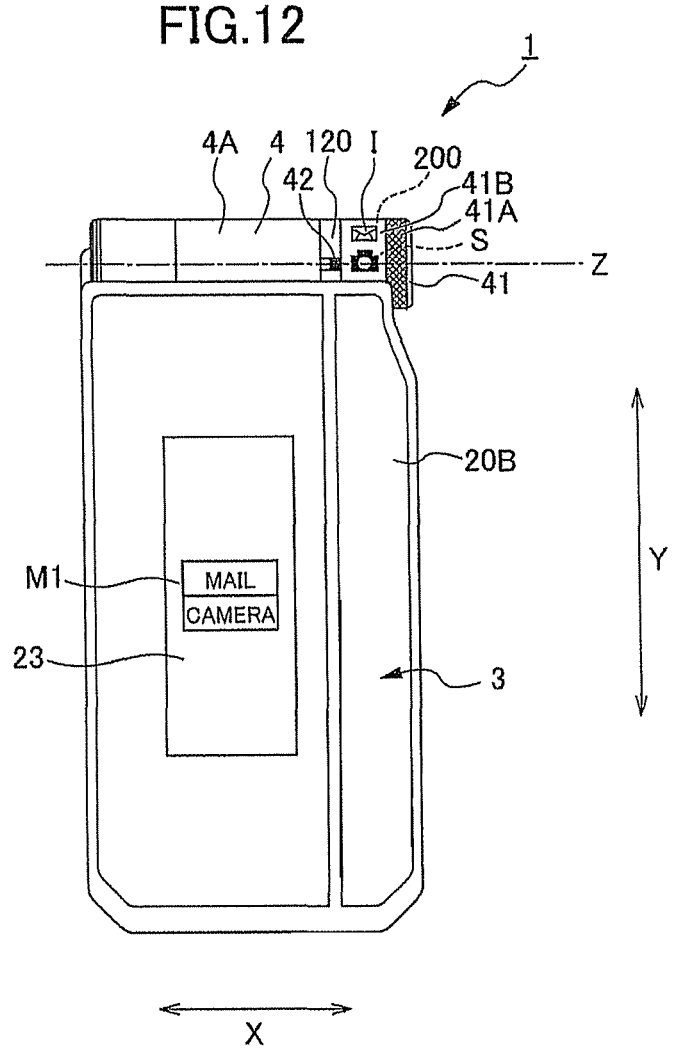
FIG. 12 is a view illustrating a menu image M1 that is displayed on a sub display in the closed state.

As shown in FIG. 12, in a case in which the cellular telephone terminal 1 is not in the opened state (i.e. is in the closed state) (ST2), the control part 74 displays the menu image M including images representing applications that can be activated in the closed state on the sub display 23 (ST12). By displaying the menu image M on the sub display 23, the cellular telephone terminal 1 notifies the user that the functions (applications) have become selectable by the rotary dial portion 41, and assists the user's selection operations as an indication for selecting the functions. Moreover, the cellular telephone terminal 1 can perform notification of the applications (functions) that are selectable in the closed state.

The user rotationally moves the rotary dial portion 41 such that an icon I representing a predetermined function is positioned in the selection position S, by using the mark 42, which is exposed in the closed state, as an indicator of the selection position S (ST13).

The rotation detecting part 72, which is in a state in which the rotation amount of the rotary dial portion 41 can be detected, detects the rotation amount in the rotary dial portion 41 that has been rotated by the user (ST14). The display contents of the menu image M that is displayed on the sub display 23 are correspondingly changed to the rotation amount in the rotary dial portion 41.

When the user disengages the finger from the rotary dial portion 41 after having selected a desired application by viewing the menu image M displayed on the sub display 23, the touch sensor 200 further detects a change in the electrostatic capacitance (ST15). After a predetermined time has elapsed since the finger disengaged from the rotary dial portion 41 (i.e. since the electrostatic capacitance changed) (ST16), the control part 74 activates an application corresponding to the icon I positioned at the selection position S (ST17). More specifically, the control part 74 activates the application for operating the function that has been correspondingly assigned to the rotation position identified by the rotation amount detected by the rotation detecting part 72.

In a case in which the user's finger is placed on the rotary dial portion 41 again before the predetermined time has elapsed since the finger disengaged from the rotary dial portion 41 (ST16), the control part 74 does not activate an application (ST1).

The control part 74 displays an image based on the application to be activated on the sub display 23 (ST18). In a case in which the finger is disengaged from the rotary dial portion 41 in a state shown in FIG. 12, the control part 74 activates the application for operating the camera function. The control part 74 then displays an image based on the activated application on the sub display 23. For example, it is possible to display, as the image based on the application for operating the camera function, the image of the subject that can be taken via the imaging portion 17, on the sub display 23.

Subsequently, the user depresses a function end key that is assigned to a side key and the like exposed in the closed state, thereby terminating the activated application (ST19).

In a case in which the function end key is depressed, and the application that has been activated is terminated, for example, the display regarding the camera function is terminated, and the communication/call standby screen as the top screen is displayed on the sub display 23 (ST20).

According to the present embodiment, the rotary dial portion 41 is directly operated, thereby making it possible to directly activate the various functions assigned to the rotary dial portion 41 under certain conditions. Accordingly, it is not necessary to go through the main menu as in conventional cases, and it is possible to easily activate a desired application.

Moreover, according to the present embodiment, since the mark 42 is formed at a position that is exposed externally both in the opened state and in the closed state, it is possible to rotate the rotary dial portion 41 by using the mark 42 as an indicator both in the opened state and in the closed state. More specifically, it is possible to rotate the rotary dial portion 41 by using the mark 42 as an indicator of the selection position both in the opened state and in the closed state. This makes it possible to provide a cellular telephone terminal 1 of which usability has been improved.

Moreover, according to the present embodiment, it is possible to select applications that are limited in the closed state based on the mark 42 and the menu image M1, which is displayed on the sub display 23. This makes it possible for the user to select a desired application while recognizing the applications that can be activated in the closed state. Moreover, this makes it possible to preferably select the applications in the closed state, which can be activated in the closed state.

Although preferable embodiments are described above, the present invention is not limited to the aforementioned embodiments, and may be implemented in various embodiments. For example, although a cellular phone device 1 is described in the present embodiment, it is not limited thereto, and may be a PHS (trade mark: Personal Handy Phone System), a PDA (Personal Digital Assistant), a navigation system and the like.

It should be noted that, although a cellular telephone terminal 1 that is foldable via the connecting portion 4 is described in the present embodiment, instead of such a flip type, it may be a slider type in which one of the bodies slides to one direction in a state in which the operation unit side body 2 and the display part side body 3 are mutually superimposed; a rotating (turning) type in which one of the bodies is rotated around an axis line along the direction of superimposing the operation unit side body 2 and the display part side body 3; and a type (straight type) in which the operation unit side body 2 and the display part side body 3 are disposed in one body without having the connecting portion. Moreover, the cellular telephone terminal 1 may be a so-called biaxial hinge type that can be opened and closed as well as rotated.

In addition, although the rotary dial portion 41 is configured so as to be rotatable around the rotational axis Z that is substantially coaxial with the opening-and-closing axis in the hinge mechanism 4A in the present embodiment, it is not limited thereto, and it may be configured so as to be rotatable according to the user's operation. For example, the rotary dial portion 41 may be configured to be rotatable around a predetermined rotational axis that is orthogonal to the rotational axis Z.

Moreover, although the functions that are selectable by the rotary dial portion 41 are as described above in the present embodiment, it is not limited thereto, and a configuration may be employed in which a menu that is frequently used by the user can be registered, or a configuration may be employed in which a desired Web address is registered in advance, and when the Web address is selected by the rotary dial portion 41, a Web browser is activated to enable browsing of a Web page of the Web address. Furthermore, the number of the functions included in the menu is not limited either to the aforementioned number (seven).

In addition, although the rotation detecting part 72 detects the rotation amount based on the number of the positional points counted by the counter portion 44 in the present embodiment, it is not limited thereto, and a predetermined sensor may detect an amount of change of the rotation angle of the rotary dial portion 41 as the rotation amount. Additionally, the rotation detecting part 72 may be configured such that, for example, the rotation amount is detected by a change in resistivity and the like to identify a rotation position.

Figure 13:
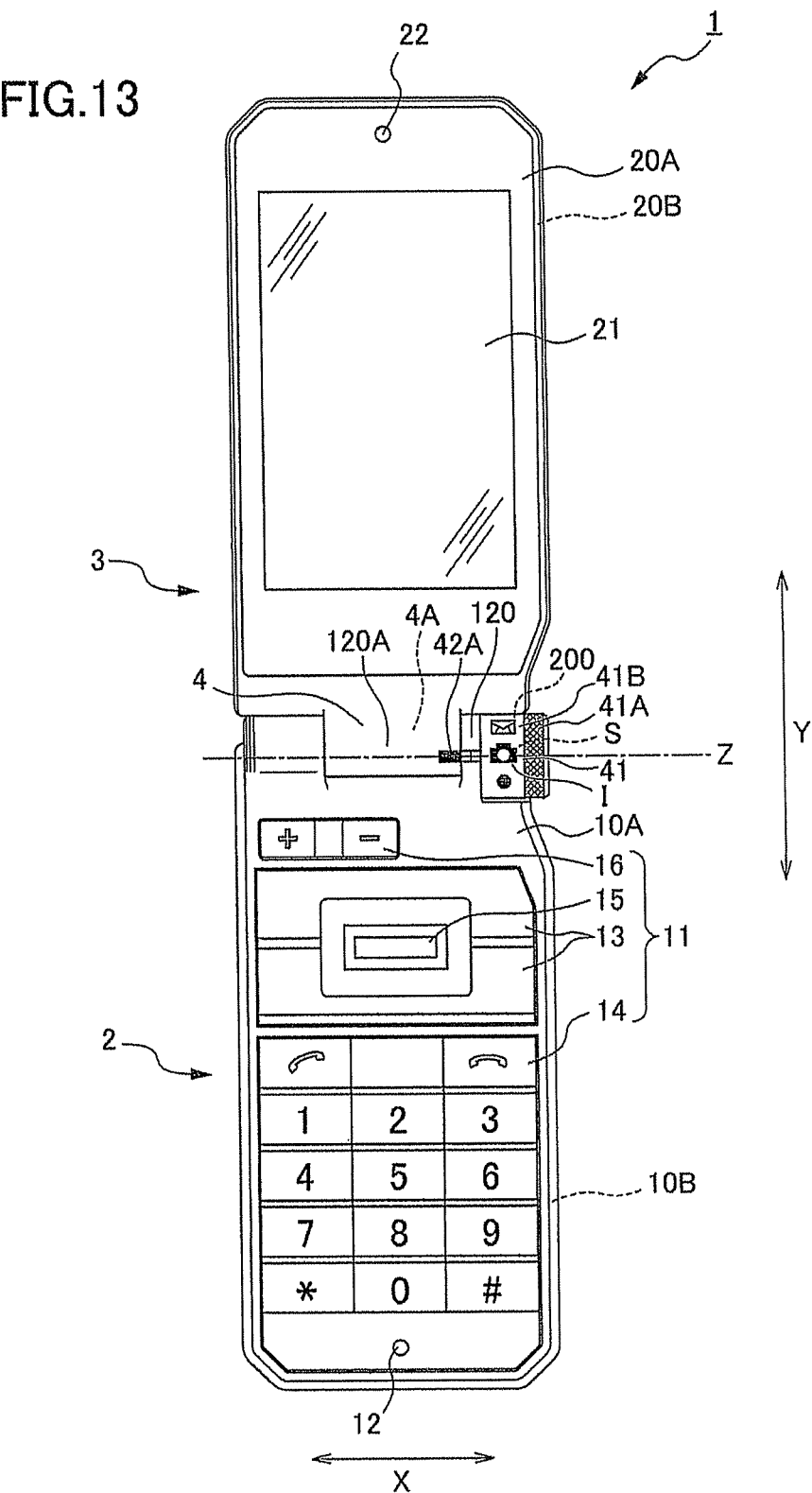
FIG. 13 is a view showing an appearance of a cellular telephone terminal in another embodiment.
Figure 14:
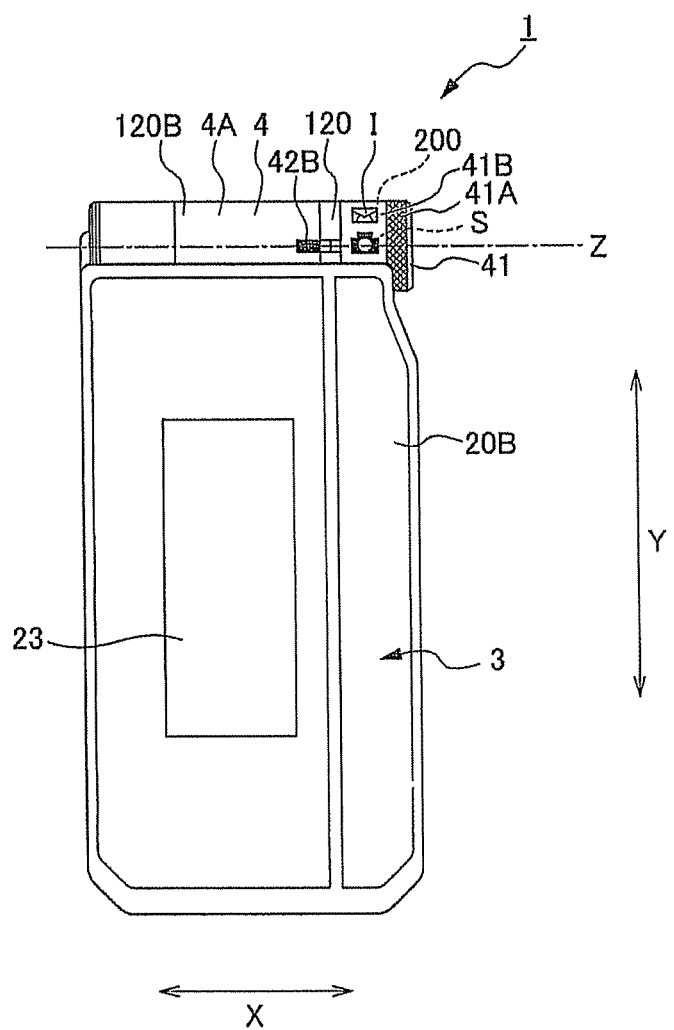
FIG. 14 is a view showing an appearance of the cellular telephone terminal in the closed state in the other embodiment, which is viewed from the display part side body.

Moreover, although the mark 42 is formed in the operation unit side body 2 in the present embodiment, it is not limited thereto, and may be formed in the display part side body 3 as shown in FIGS. 13 and 14.

More specifically, as shown in FIGS. 13 and 14, a first mark 42A and a second mark 42B as indicators are each formed on a portion, which is a part of the display part side body 3, and constitutes the connecting portion 4. Particularly, as shown in FIG. 13, the first mark 42A as the first mark is formed in a first exposed portion 120A, which is a portion constituting the connecting portion 4 in the display part side body 3, and is exposed externally in the opened state. Moreover, as shown in FIG. 14, the second mark 42B as the second mark is formed in a second exposed portion 120B, which is a portion constituting the connecting portion 4 in the display part side body 3, and is exposed externally in the closed state. In other words, it is configured such that the first mark 42A is disposed in a predetermined position in the opened state, and the second mark 42B is disposed in a predetermined position in the closed state.

In this case, the rotary dial portion 41 is attached to a position facing the first exposed portion 120A and the second exposed portion 120B, by interposing a portion constituting the connecting portion 4 in the operation unit side body 2. In other words, the rotary dial portion 41 is attached to a position facing the first mark 42A and the second mark 42B, by interposing a portion constituting the connecting portion 4 in the operation unit side body 2.

Figure 15:
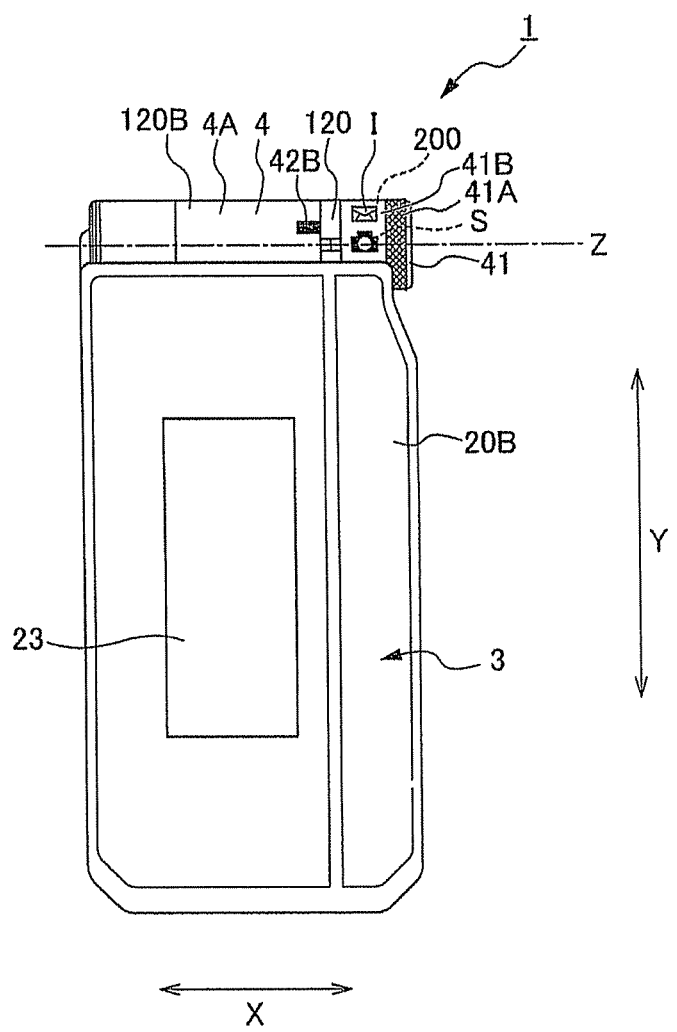
FIG. 15 is a view showing an appearance of a cellular telephone terminal in the closed state in another embodiment, which is viewed from the display part side body.

Here, in a case in which all the applications are not activated in the closed state, as shown in FIG. 15, the position, on which the second mark 42B is formed, may be adjusted such that the icon I positioned beside the first mark 42A in the opened state is not aligned (or is dislocated) with the second mark 42B in the closed state.

Modified Example of First Embodiment

Next, a modified example of the aforementioned first embodiment is described. As described above, the processing unit 70 is provided with the opened/closed detecting part 73 that detects whether or not the bodies are in the closed state. Moreover, when the rotation detecting part 72 has detected the rotation of the rotary dial portion 41, it is preferable for the control part 74 to control such that, in a case in which the opened/closed detecting part 73 detects that the bodies are not in the closed state, a predetermined application in accordance with the rotation state is activated, and a display screen corresponding to the activated predetermined application is displayed on the display 21, and in a case in which the opened/closed detecting part 73 detects that the bodies are in the closed state, a new application is not activated.

With such a configuration, in the present invention, no application is activated when the bodies are in the closed state, even if the rotary dial portion 41 is operated, and various applications can be activated in accordance with the rotation amount of the rotary dial portion 41 when the bodies are in the opened state.

Moreover, when the rotation detecting part 72 has detected the rotation of the rotary dial portion 41, it is preferable for the control part 74 to control such that, in a case in which the opened/closed detecting part 73 detects that the bodies are in the closed state, a predetermined application in accordance with the rotation state is identified, and in a case in which the opened/closed detecting part 73 detects that the bodies have transitioned thereafter to a state that is not the closed state, the identified predetermined application is activated, and a display screen corresponding to the activated predetermined application is displayed on the display 21.

With such a configuration, in the present invention, since the application selected by the user when in the closed state is identified in the closed state, and the identified application is activated when the bodies transition thereafter to the opened state, it is possible to reduce the activation time of a desired application as compared to another operation method (an application is selected after changing the bodies into the opened state, and then the application is activated).

Moreover, when the rotary dial portion 41 is rotated, it is preferable for the rotation detecting part 72 to notify the control part 74 of the rotation state on the condition that the rotation state at this time has continued for a certain duration (e.g., 1 or 2 seconds). For example, when the rotary dial portion 41 is rotated 45 degrees in the direction a shown in FIG. 5, the rotation detecting part 72 notifies the control part 74 of the rotation amount (45 degrees) on the condition that this rotation state at 45 degrees has been maintained for 1 to 2 seconds. The control part 74 activates the camera function of the imaging portion 17 in accordance with the rotation amount (45 degrees).

With such a configuration, the present invention can prevent an operational error of the rotary dial portion 41, thereby making it possible to prevent activation of an application which is not desired by the user, and to reduce power requirements.

Moreover, when the rotary dial portion 41 is rotated, it is preferable for the rotation detecting part 72 to notify the control part 74 of the rotation state on the condition that this rotation state has continued for a certain duration, and when the control part 74 is notified of the rotation state of the rotary dial portion 41 by the rotation detecting part 72, it is preferable for the control part 74 to control such that, in a case in which the opened/closed detecting part 73 detects that the bodies are not in the closed state, a predetermined application in accordance with the rotation state is activated, and a display screen corresponding to the activated predetermined application is displayed on the display 21.

With such a configuration, the present invention makes it possible to prevent activation of applications when the bodies are in the closed state. In other words, it is possible to maintain an application that has been activated in the opened state.

Moreover, in a state in which a predetermined standby screen is displayed on the display 21 in a call-standby state, when the bodies transition from the opened state to the closed state, the control part 74 controls as follows:

1. In a case in which the opened state is entered again without performing a rotation operation of the rotary dial portion 41 in the closed state, the standby screen is displayed on the display 21; and 2. In a case in which the opened state is resumed after performing a rotation operation of the rotary dial portion 41 in the closed state, an application in accordance with the rotation state by the rotation operation is activated, and a display screen corresponding to the application is displayed on the display 21.

With such a configuration, in the present invention, in a case in which the bodies transition from the closed state to the opened state, it is possible to change the activation state of an application in the opened state in accordance with the activation state of the application in the closed state. Moreover, in the present invention, it is possible to reduce the activation time of a desired application as compared to another operation method (an application is selected after changing the bodies into the opened state, and then the application is activated).

Moreover, in a case in which the rotation detecting part 72 detects rotation when the bodies are in the closed state, and an application to be activated is determined based on the rotation state, the control part 74 controls as follows:

1. In a case of a first application that can be activated when the bodies are in the closed state, the first application is activated; and 2. In a case of a second application that can not be activated when the bodies are in the closed state, the second application is not activated.

Moreover, the control part 74 controls such that, in a case in which it is the second application that cannot be activated when the bodies are in the closed state, the second application is not activated, and thereafter, in a case in which the opened/closed detecting part 73 detects that the bodies are in the opened state, the second application is activated.

In addition, the control part 74 determines an application to be activated by referring to a table in which the applications to be activated are respectively assigned based on the state of the bodies and the rotation amount according to the rotation detecting part 72.

With such a configuration, the present invention makes it possible to use applications to be activated differently depending on the opened state and the closed state of the bodies. For example, in a case in which the bodies are in the opened state, mail messages are browsed, on the other hand, in a case in which the bodies are in the closed state (it is assumed that the mail function cannot be used in the closed state), it is possible to play music with a music playing application (music player). In this way, it is possible to switch applications depending on the change between the opened state and the closed state of the bodies.

Furthermore, the control part 74 can execute, and switch between, the standard application, which displays a predetermined standby screen on the display part in a communication standby state, and the other applications. Such a control part 74 controls such that, when the rotation detecting part 72 detects rotation in a state in which the standard application is activated, a predetermined application in accordance with the detected rotation state is activated in place of the standard application, and a screen based on the predetermined application is displayed on the display 21 in place of the standby screen.

Figure 16:
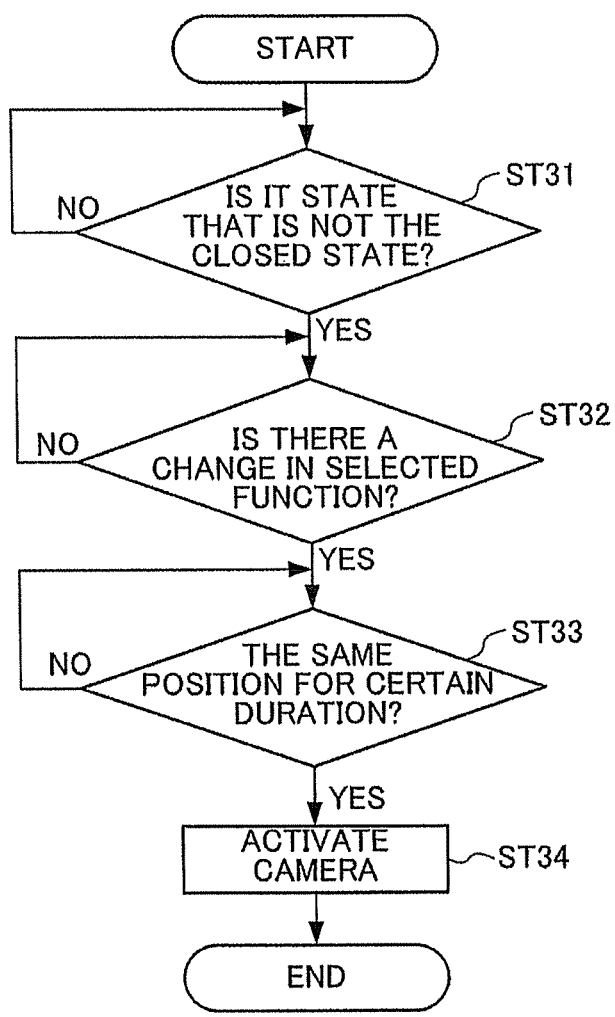
FIG. 16 is a flowchart illustrating operations of a control part at the time of activating a certain application when the bodies are in the opened state.

Here, operations of the control part 74, in a case of activating the camera function of the imaging portion 17 when the bodies are in the opened state, are described with reference to a flowchart shown in FIG. 16.

In Step ST31, the control part 74 determines whether or not the bodies (hereinafter referred to as a folder) are in the opened state, namely a state that is not the closed state, based on a detection value supplied from the opened/closed detecting part 73. In a case in which it is determined that the folder is in the opened state (YES), the processing proceeds to Step ST32, and in a case in which it is determined that the folder is in the closed state (NO), the processing of Step 31 is repeated. It should be noted that, in a halfway state in which the folder is neither in the closed state nor the opened state, it is determined that the folder is not in the closed state, and the processing of Step ST31 is repeated. As described above, in the opened state, the control part 74 displays the standby screen on the display 21 based on the standard application program under the control of the OS.

In Step ST32, the control part 74 determines whether or not the rotation detecting part 72 has notified of rotation amount, i.e., whether or not rotation has occurred and there is a change in the selected function. In a case in which it is determined that there is a change (YES), the processing proceeds to Step ST33, and in a case in which it is determined that there is not a change (NO), the processing of Step ST32 is repeated.

In Step ST33, the control part 74 determines whether or not notification of a certain rotation amount from the rotation detecting part 72 has been continued to be detected for a certain duration. In a case in which it is determined that the detection has been continued for a certain duration (YES), the processing proceeds to Step ST34, and in a case in which it is determined that the detection has not been continued for a certain duration (NO), the processing of Step ST33 is repeated.

In Step ST34, the control part 74 activates a predetermined application (the camera function of the imaging portion 17 in the present example).

Figure 17:
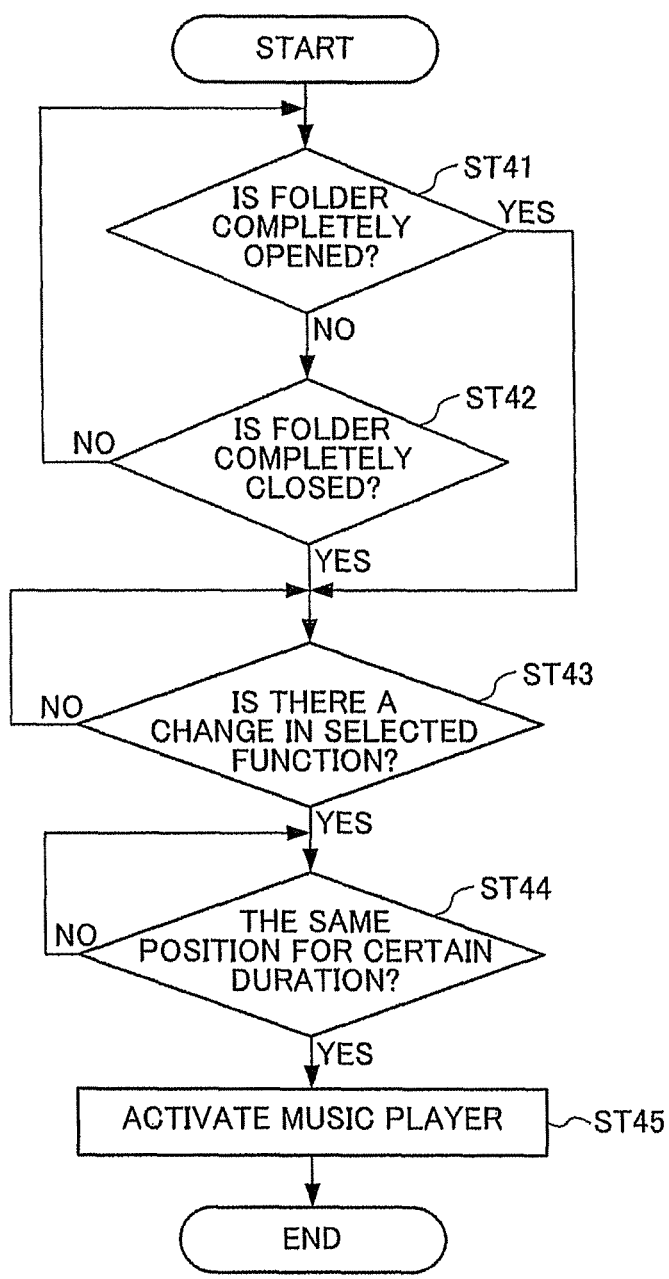
FIG. 17 is a flowchart illustrating operations of the control part at the time of activating a certain application when the bodies are either in the opened state or the closed state.

Next, operations of the control part 74, in a case of activating a certain application (e.g., the music player) when the bodies are either in the opened state or the closed state, are described with reference to a flowchart shown in FIG. 17.

In Step ST41, the control part 74 determines whether or not the folder is in the opened state, based on a detection value supplied from the opened/closed detecting, part 73. In a case in which it is determined that the folder is in the opened state (YES), the processing proceeds to Step ST43, and in a case in which it is determined that the folder is not in the closed state (NO), the processing proceeds to Step ST42.

In Step ST42, the control part 74 determines whether or not the folder is in the closed state, based on a detection value supplied from the opened/closed detecting part 73. In a case in which it is determined that the folder is in the closed state (YES), the processing proceeds to Step ST43, and in a case in which it is determined that the folder is not in the closed state (NO), the processing returns to Step ST41. The present processing indicates that, in a halfway state in which the folder is neither in the closed state nor the opened state, it is determined that the folder is not in the closed state, and the processing returns to Step ST41. As described above, in the opened state, the control part 74 displays the standby screen on the display 21 based on the standard application program under the control of the OS.

In Step ST43, the control part 74 determines whether or not the rotation detecting part 72 has notified of a rotation amount, i.e. whether or not there is a change in the selected function. In a case in which it is determined that there is a change (YES), the processing proceeds to Step ST44, and in a case in which it is determined that there is no change (NO), the processing of Step ST43 is repeated.

In Step ST44, the control part 74 determines whether or not notification of a certain rotation amount from the rotation detecting part 72 has continued to be detected for a certain duration. In a case in which it is determined that the detection has not continued for a certain duration (NO), the processing of Step ST44 is repeated.

Moreover, in a case in which the detection has continued for a certain duration (YES), the control part 74 refers to the table 110, and identifies an application in accordance with the rotation amount. In a case in which a state of the bodies at the time when the application was identified in accordance with the rotation amount is the opened state, the processing proceeds to Step ST45. However, in a case in which the state of the bodies at this time is the closed state, it is further determined whether the identified application is the first application that can be activated even in the closed state, or the second application that cannot be activated in the closed state. In a case in which it is determined that it is the second application, the processing of Step ST44 is repeated, and in a case in which it is determined that it is the first application, the processing proceeds to Step ST45.

In Step ST45, the control part 74 activates a predetermined application (the music player in the present example).

The control part 74 activates a music processing device corresponding to the music playing application, thereby starting music playback and the like. Moreover, an operation screen and the like based on the newly activated music playing application is displayed in place of the standby screen on the display 21 in the opened state or on the sub display 23 in the closed state in accordance with the control of the control part 74. It should be noted that, when the call-end key (on-hook key) (input operation key 14) included among the input operation keys is operated, the standard application program is activated again after terminating or interrupting the music playing application under the control of the OS. The control part 74 causes the display to transition from the music player screen to the standby screen.

It should be noted that, in the processing of Step ST41, even in a case of the opened state in which an application program that has been activated is not the standard application program, but is another application program, the application program that has been activated is terminated, and a new application program is activated. The control part 74 controls so as to change from the screen based on the previous application program to a screen based on the new application program.

In this way, according to the present invention, the rotary dial portion 41 is directly operated, thereby making it possible to directly activate the various functions assigned to the rotary dial portion 41 under certain conditions. Accordingly, it is not necessary to go through the main menu as in conventional cases, and it is possible to easily activate a desired application.

According to the embodiments of the present invention, an application is not activated unless a certain rotation amount continues for a certain duration, thereby circumventing the need to activate an application every time the user performs rotation multiple times by habit, and preventing wasteful electric power consumption from occurring. Moreover, in a case in which slight rotation of the rotary dial portion 41 is detected and an application is immediately activated, a problem is considered in which activation and termination of all the applications are repeated on the way such as at 45 degrees and 90 degrees, even though the user desires to activate an application that is positioned at 180 degrees from the neutral position. However, since the present example is configured such that an application is not activated unless a certain rotation amount continues for a certain duration, the applications on the way are not activated as long as the rotation is performed quickly to a position at 180 degrees, thereby making it possible to reduce electric power consumption.

Moreover, in most of the cases in which the bodies are configured so as to be openable and closable, one of the main display (corresponding to the display 21 in the present example) and the main operation unit (corresponding to the input operation keys 14 in the present example) is in a state of not being exposed externally in the closed state. In other words, the operability is limited in the closed state. Moreover, the closed state is a form for transport when hand held in many cases.

In the embodiments of the present invention, a configuration example is also shown in which all the applications can be activated by rotation operation in the opened state, and all the applications cannot be activated or only a part of the applications can be activated in the closed state. With such a configuration, the operability is limited in the closed state, and the applications that cannot be correctly operated, even if activated in the closed state, are not activated in the closed state. Accordingly, in a case in which the rotated rotary dial portion 41 is unintentionally rotated during transport and the like, the applications, which are not usually operated, are not activated, thereby further reducing wasteful electric power consumption.

With a configuration in which the dial is rotated in the closed state, and a corresponding application is not activated until the closed state transitions to the opened state, it is possible to activate an application only when entering a state in which operation thereof is possible. In other words, even in a case in which the dial is rotated multiple times in the closed state, an application is activated only when finally transitioning to the opened state, thereby making it possible to significantly reduce the number of times of activating the applications, and to lead to the reduction of electric power consumption.

It should be noted that, although an example is shown in which an application to be activated is identified based on the rotation amount of the rotary dial portion 41 in the present embodiment, it is not limited thereto. In other words, only a rotation state has to be determined, and in addition to detection of a changed amount, for example, a configuration may be employed in which only a final rotation position is detected. Moreover, by storing the final rotation positions being respectively associated with the applications in the table 110, it is also possible to configure such that an application corresponding to an identified position is activated by referring to the table 110.

Furthermore, it may be configured such that a time from starting rotation to reaching a final rotation position is measured, thereby determining whether the rotation is fast or slow, and an application to be activated is changed in accordance thereto. In this case, by storing the rotation times being respectively associated with the applications to be activated in the table 110, and referring to the table regarding the time from the start of the rotation to the end of the rotation, for example, it is also possible to activate different applications depending on the difference of the rotation speed, even in a case in which the rotation is performed to the same position.

Second Embodiment

Moreover, a plurality of identifiable abstract symbols I (e.g., circle, triangle, rectangle and the like) may be respectively allocated to predetermined intervals in the rotation direction of the rotary dial portion 41. In this case, each of the symbols allocated to the rotary dial portion 41 is processed (e.g., three-dimensionally processed) so as to be recognizable by a tactile sense of a finger, in order to avoid the necessity for the user to visually confirm the symbols allocated to the rotary dial portion 41.

Figure 18:
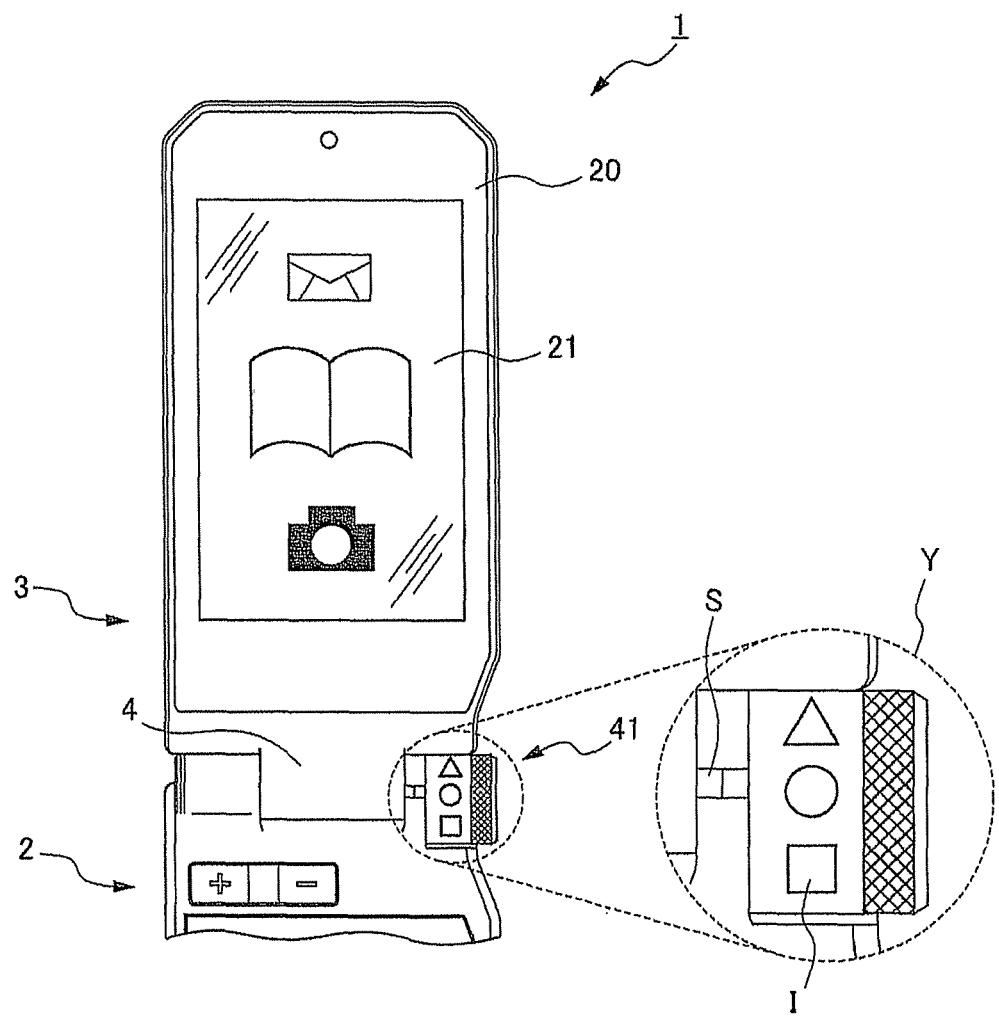
FIG. 18 is a view illustrating rotation of the rotary dial portion and a display mode of the display part.

As shown in FIG. 18, the present invention has a function to schematically display a rotation state of the rotary dial portion 41 on the display 21 by using display objects, when selecting a predetermined application by operating the rotary dial portion 41 in a case in which the cellular telephone terminal 1 is in the opened state. By having such a function, since it is possible to assist the operation of the rotary dial portion 41 with the displaying on the display 21, it possible to improve the operability for the user.

It should be noted that, in FIG. 18, the display object for the application corresponding to the icon I on the rotary dial portion 41, the icon I being currently positioned in the selection position (mark) S, is displayed on the display 21 so as to be larger than the adjacent display objects for the other applications. Moreover, the rotary dial portion 41 is shown in an enlarged manner in Y of FIG. 18.

Next, advantages in allocating the abstract symbols to the rotary dial portion 41 are described. For example, in a case in which the mail function is activated by an operation of the rotary dial portion 41, in which the mail that is being browsed includes a feature capable of accessing a predetermined Web page (a so-called hyperlink function), and the function is selected and the predetermined Web page is browsed, the browser function is activated, and the mail function is terminated or enters a non-active state. Under such circumstances, in a case in which indicators (e.g., icons represented by pictures) directly connected to the applications to be activated are allocated to the rotary dial portion 41, there is a possibility that the indication (the mail function) on the rotary dial portion 41 may be different from the currently active application (the browser function), and impart a feeling of discomfort to the user.

Accordingly, in the present invention, instead of a symbol directly connected to the currently active application, an abstract symbol is allocated to the rotary dial portion 41, a result of which the discomfort is not imparted onto the user, even if the aforementioned situation arises.

Figures 19A, 19B, 19D:
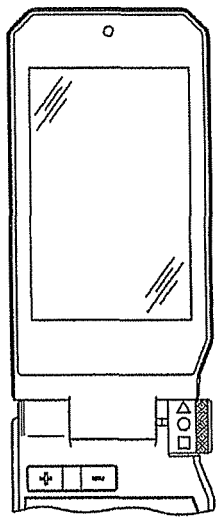
FIGS. 19A to 19E are views illustrating relationships between respective symbols allocated to the rotary dial portion and applications to be activated.

Moreover, relationships between respective symbols allocated to the rotary dial portion 41 according to the present invention and applications to be activated are hereinafter described with reference to FIG. 19. For example, as shown in FIG. 19A, in a case in which a triangle symbol on the rotary dial portion 41 is positioned in the selection position (mark) S, the neutral (N), which is namely the function to display the standby screen, is assigned to the triangle symbol. Moreover, a calculator function is assigned to a star symbol allocated to the position that is rotated 45 degrees in the direction a. Moreover, a one-segment function is assigned to a circle symbol allocated to the position that is rotated 45 degrees in the direction b. In addition, the mail function is assigned to a rectangle symbol allocated to the position that is rotated 90 degrees in the direction b. Moreover, the address book function is assigned to a cross (x) symbol allocated to the position that is rotated 135 degrees in the direction b (refer to FIG. 19B). Moreover, the rotary dial portion 41 is rotationally moved in response to the operation by the user so as to be rotated 45 degrees in the direction b, and a predetermined operation is performed whereby the one-segment function assigned to the circle symbol is activated.

Figure 19C:
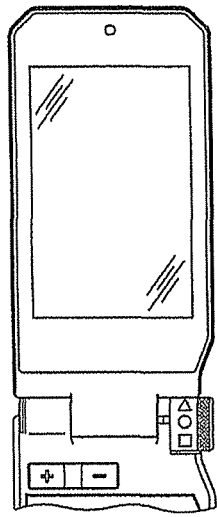
Figure 19E:
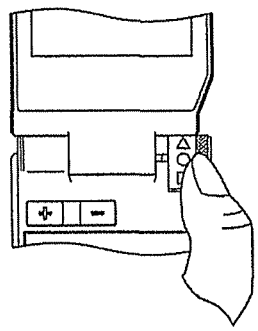

When the user performs a termination operation for the one-segment function (e.g., a depression operation of the on-hook key), the one-segment function is terminated, and the standby screen is resumed (refer to FIG. 19C). In this case, the function to display the standby screen is assigned to the circle symbol, and the calculator function is assigned to the triangle symbol allocated to the position that is rotated 45 degrees in the direction a. Moreover, an alarm function is assigned to the star symbol allocated to the position that is rotated 90 degrees in the direction a. In addition, the one-segment function is assigned to the rectangle symbol allocated to the position that is rotated 45 degrees in the direction b. Furthermore, the mail function is assigned to the cross (x) symbol allocated to the position that is rotated 90 degrees in the direction b (refer to FIGS. 19D and 19E). Additionally, the cellular telephone terminal 1 may be configured so as to perform displaying on the display 21 and the sub display 23 in order to visually indicate the relationship between the abstract indicators as shown in FIGS. 193 and 19D and the functions thereof.

Moreover, FIG. 20 shows the relationship between the respective symbols allocated to the rotary dial portion 41 and the applications originally assigned thereto, as well as the relationship between the respective symbols and the applications assigned thereto after the on-hook operation.

With such a configuration, the function to display the standby screen is assigned to a symbol that is positioned in the selection position (mark) S at the time when the standby screen is displayed. Accordingly, it is always possible to activate a predetermined application in accordance with a certain operation from the standby screen, and to achieve an improvement in the operability.

Figure 21:
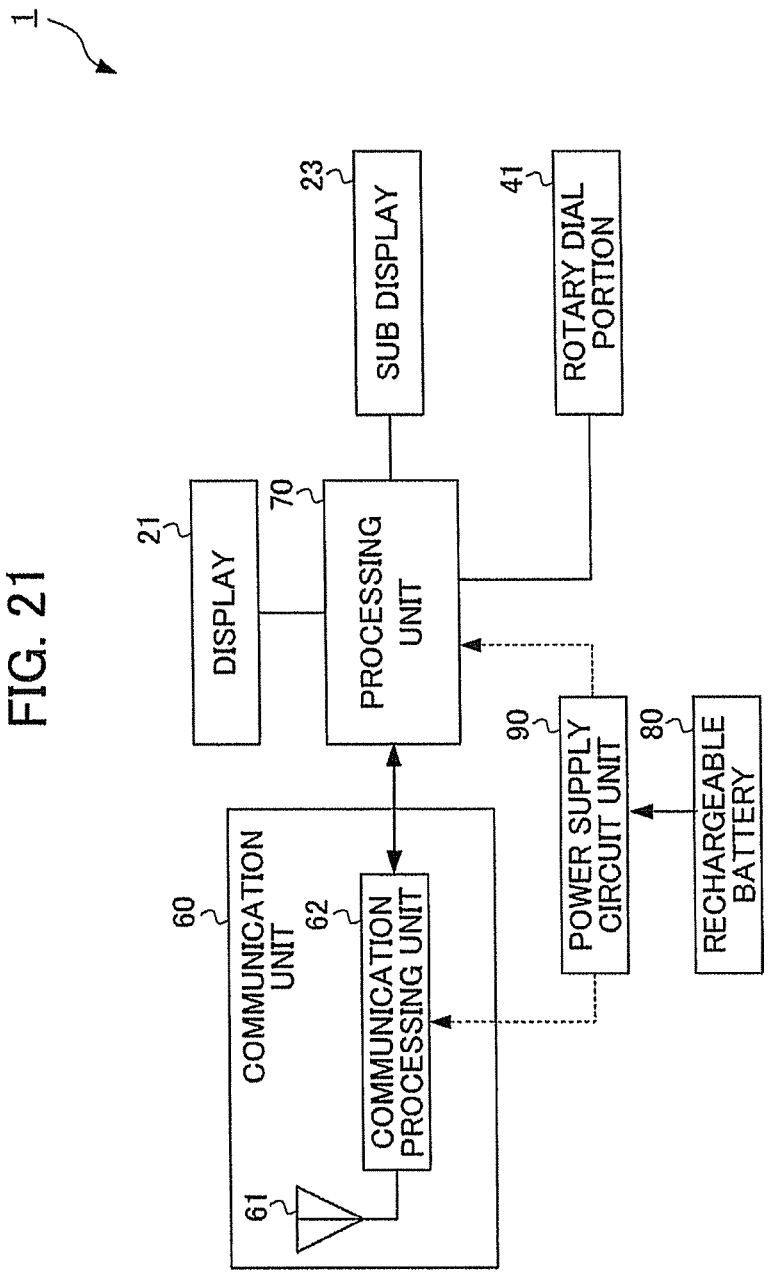
FIG. 21 is a functional block diagram showing functions of the cellular telephone terminal.

Here, configurations for implementing the aforementioned functions are described. As shown in FIG. 21, the cellular telephone terminal 1 is provided with: the display 21 that displays predetermined information; the sub display 23 that displays predetermined information; the rotary dial portion 41 that is rotated according to the user's operation; the communication unit 60 that performs communication with external terminals; the processing unit 70 that performs predetermined processing; the rechargeable battery 80 having a predetermined capacity; and the power supply circuit unit 90, which converts a power supply voltage supplied from the rechargeable battery 80 into a predetermined voltage, and which feeds the converted voltage to the communication unit 60, the processing unit 70 and the like.

The communication unit 60 is provided with: the main antenna 61 that performs communications with an external device at a predetermined frequency band to be used; and the communication processing unit 62 that performs signal processing such as modulation processing or demodulation processing.

The main antenna 61 performs communication with the external device (base station) at a predetermined frequency band to be used (e.g., 800 MHz). It should be noted that, although the predetermined frequency band to be used is 800 MHz in the present embodiment, another frequency band may be used. Moreover, in addition to the predetermined frequency band to be used, the main antenna 61 may be configured with a so-called dual band adaptive type that is adaptive to a second frequency band to be used (e.g., 2 GHz), and furthermore, it may be configured with a multiple band adaptive type that is adaptive to a third frequency band to be used.

The communication processing unit 62 applies demodulation processing to signals received by the main antenna 61, and supplies the processed signals to the processing unit 70, while the communication processing unit 62 applies modulation processing to the signals supplied from the processing unit 70, and transmits the signals to the external device (base station) through the main antenna 61.

The power supply circuit unit 90 transforms a power supply voltage, which is supplied from the rechargeable battery 80, to a predetermined voltage value, and supplies the transformed voltage to the communication unit 60, the processing unit 70 and the like.

Figure 22:
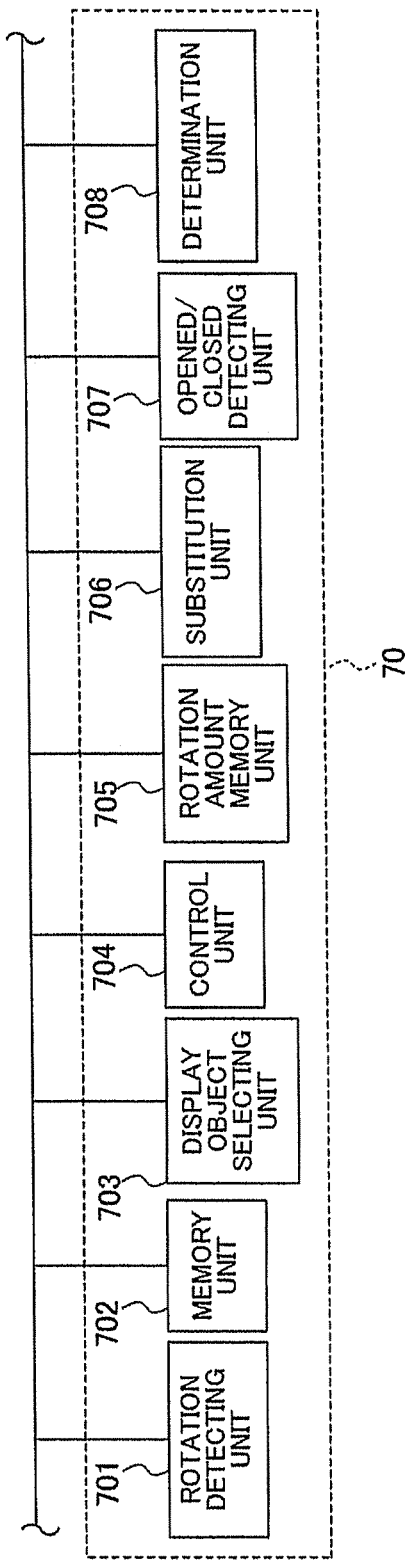
FIG. 22 is a functional block diagram showing functions of the processing unit provided to the cellular telephone terminal.

As shown in FIG. 22, the processing unit 70 is provided with: a rotation detecting part 701 that detects a rotation amount at a time when the rotary dial portion 41 is rotated; a memory unit 702 that stores the rotation amount, which is detected by the rotation detecting part 701, and the applications to be activated, by associating thereof as a defined order; a display object selecting part 703, which identifies an application corresponding to the rotation amount detected by the rotation detecting part 701, and which selects a display object corresponding to the identified application; and a control part 704 that displays the display objects on the display part.

Moreover, when the rotary dial portion 41 is rotated, the display object selecting part 703 identifies an application corresponding to the rotation amount detected by the rotation detecting part 701, and selects a display object corresponding to the identified application as well as display objects corresponding to applications adjacent to the identified application in accordance with the defined order. Moreover, the control part 704 controls such that the selected display objects are displayed on the display 21 in place of a predetermined standby screen.

It should be noted that, although the rotation detecting part 701 detects an amount of change of the angle of the rotary dial portion 41 as the rotation amount in the present example, it is not limited thereto, and the change depending on the rotation of the rotary dial portion 41 may detected and, for example, a change of resistivity may be detected as the rotation amount.

With such a configuration, the present invention makes it possible to display the rotation situation on the display 21 in an enlarged manner in accordance with the rotation of the rotary dial portion 41, thereby making it possible to improve the operability by the rotary dial portion 41.

Moreover, as described above, the abstract symbols are allocated to the surface of the rotary dial portion 41 in predetermined intervals in the rotation direction. Moreover, as shown in FIG. 22, the processing unit 70 is provided with a rotation amount memory unit 705 and a substitution unit 706.

The rotation amount memory unit 705 stores the rotation amount detected by the rotation detecting part 701.

In a case in which an application corresponding to the rotation amount stored in the rotation amount memory unit 705 is activated, and thereafter another application is activated without being based on the rotation amount stored in the rotation amount memory unit 705, the substitution unit 706 reads the rotation amount corresponding to the other application by referring to the memory unit 702, and performs substitution with the read rotation amount.

With such a configuration, in the present invention, the symbols allocated to the rotary dial portion 41 are the abstract ones (e.g., circle, triangle, rectangle and the like), which do not need to correspond to the applications to be activated, a result of which the difference between the activated application and the symbol on the rotary dial portion 41 does not impart a feeling of discomfort onto the user.

Moreover, as shown in FIG. 22, the processing unit 70 is provided with an opened/closed detecting part 707 and a determination part 708.

The opened/closed detecting part 707 detects the opened state and the closed state of the bodies. The determination part 708 determines the number of display objects to be displayed on the display 21 based on the detection result by the opened/closed detecting part 707. Moreover, the control part 704 controls such that the display objects of the number determined by, the determination part 708 are displayed on the display 21.

With such a configuration, in the present invention, the appearance image of the rotary dial portion 41, which is visually recognized by the user in actuality, is schematically displayed on the display 21. For example, in a case in which the number of the symbols visually recognized on the rotary dial portion 41 is 3, the number of the display objects displayed on the display 21 is also 3. Therefore, in the present invention, discomfort is not imparted onto the user in operation.

In addition, the rotary dial portion 41 is rotatably attached so as to be coaxial with the hinge axis of the hinge mechanism 4A. Moreover, the control part 704 controls such that the display objects displayed on the display 21 are moved to the direction orthogonal to the hinge axis, i.e. moved to the direction that is the same as the rotation direction of the icons I allocated on the rotary dial portion 41.

With such a configuration, in the present invention, the rotation direction of the rotary dial portion 41 is synchronized with the scrolling direction of the display objects displayed on the display 21, as result of which discomfort is not imparted onto the user.

Modified Example of First and Second Embodiments

Next, a modified example of the aforementioned first and second embodiments is described. The present invention has a function whereby, in a configuration in which a plurality of particular applications (e.g., an application for playing music and an application for reproducing images) share a device for performing predetermined processing, when the device enters an ON state as a result of activation of one particular application, the one particular application is terminated, and another application is subsequently activated, the ON state of the device is maintained in the present condition. By having such a function, a situation in which the device is frequently switched between the ON state and the OFF state is avoided, thereby making it possible to reduce the electric power consumption thereof.

Figure 23:
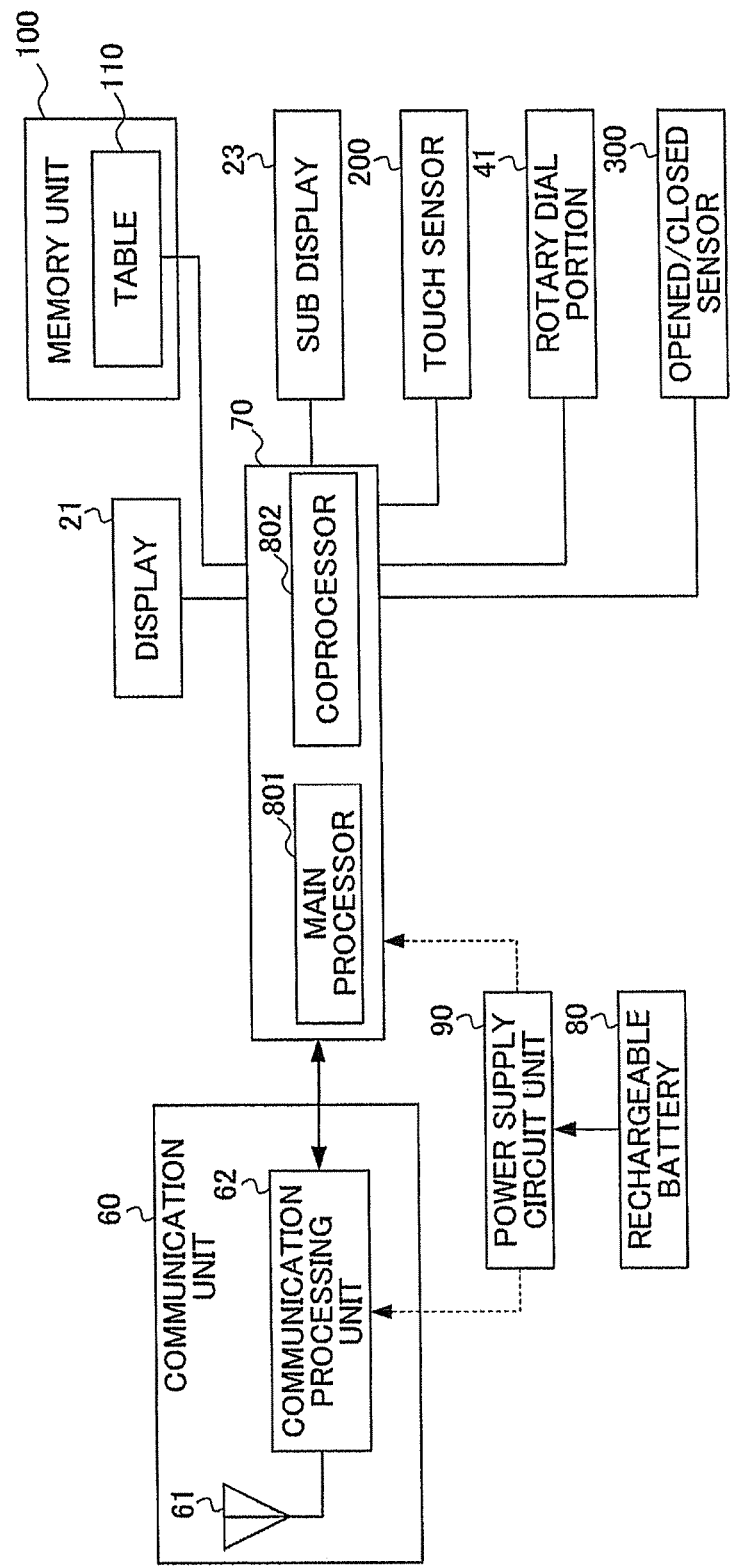
FIG. 23 is a functional block diagram showing functions of the cellular telephone terminal.

Here, a configuration is described, in which a main processor 801 and a coprocessor 802 are operated in a coordinated manner, thereby reducing the electric power consumption. It should be noted that, in the following description, although it is assumed that the icons (indicators) Ia to Ih, which represent particular applications, are allocated to the rotary dial portion 41 in the rotation direction, it is not limited thereto, and a configuration may be employed in which a plurality of identifiable abstract symbols I (e.g., circle, triangle, rectangle and the like) are respectively allocated in predetermined intervals, as described in the second embodiment. Moreover, in the following description, the processing unit 70 is configured with the main processor 801 and the coprocessor 802, as shown in FIG. 23.

The main processor 801 has: a function as a rotation detecting part that detects, as a rotation amount, a distance from a standard position to each icon at the time when the rotary dial portion 41 is rotated; and a function as an application determination part that determines an application corresponding to the rotation amount by referring to the table 110 stored in the memory unit 100 when the rotation amount is detected. Moreover, the coprocessor 802 performs predetermined processing in a plurality of particular applications (e.g., corresponding to an application for playing music, an application for reproducing images, and the like).

With such a configuration, the main processor 801 controls such that, in a case in which the application determined by the application determination part is a particular application, predetermined electric power is supplied to the device (coprocessor 802). Alternatively, the sleep mode of the device is cancelled.

Moreover, in the table 110 stored in the memory unit 100, each application is associated with each rotation amount such that particular applications are adjacent to each other in the rotation direction of the rotary dial portion 41. Moreover, as shown in FIG. 5, the icons Ia to Ih, which represent the particular applications, are allocated to the rotary dial portion 41 in the rotation direction.

According to the present invention, for example, in a case in which the application for browsing images is selected after activating the application for playing music, the device (coprocessor 802) is already in an activated state, which is then continued, a result of which it is possible to quickly display an image immediately after activating the application for browsing images. Moreover, since the device (coprocessor 802) is not frequently switched between the ON (non-sleep) state and the OFF (sleep) state, it is possible to avoid increasing electric power. In addition, since the main processor 801 can transition to a standby (sleep) state while the coprocessor 802 is operating, it is possible to achieve a reduction in the electric power consumption. In this case, when the rotary dial portion 41 is rotated, the sleep state of the main processor 801 is cancelled by interrupting thereof.

Moreover, after the OS (Operating System) is activated by turning on the main power supply, the main processor 801 detects a rotation amount in accordance with the rotation operation of the rotary dial portion 41, identifies a particular application based on the rotation amount, and at this time, activates the particular application by using the function of the standard application.

With such a configuration, the particular applications according to the present invention can be installed to any kind of electronic device as long as an OS is installed therein, and thus has versatility.

Moreover, in a case in which the main processor 801 detects a rotation amount in accordance with the rotation operation of the rotary dial portion 41 while a particular application is activated, and determines another particular application, which is different form the particular application that is currently activated, based on the rotation amount, the main processor 801 continues to feed the electric power to the device (corresponding to the coprocessor 802).

With such a configuration, according to the present invention, for example, in a case in which the application for browsing images is selected after activating the application for playing music, the coprocessor 802 is already in an activated state, which is then continued, a result of which it is possible to quickly display an image immediately after activating the application for browsing images. In addition, since the coprocessor 802 is not frequently switched between the ON (non-sleep) state and the OFF (sleep) state, it is possible to avoid increasing electric power.

Furthermore, the coprocessor 802 is, for example, a processing unit that decodes encoded data. Moreover, the particular applications correspond at least to an application for playing encoded music data by using the coprocessor 802, or an application for reproducing encoded image data by using the coprocessor 802.

According to the present invention, since the electric power supply to the coprocessor 802 is not stopped, for example, in a case in which the application for playing music data has been selected, and the application for reproducing image data is selected thereafter, quick activation of the latter is possible.

Moreover, as shown in FIG. 1, the operation unit 11 is provided with the call-end key 14a, which is used for instructing termination of a call, and which is used for instructing termination of an application in a case in which the application is being activated by using the function of the standard application. It should be noted that the call-end key 14a corresponds to the so-called on-hook key.

Furthermore, after the OS is activated by turning on the main power supply, the main processor 801 displays a predetermined standby screen on the display 21, detects a rotation amount in accordance with the rotation operation of the rotary dial portion 41, identifies a particular application based on the rotation amount, and at this time, activates the particular application in place of the standby screen by using the function of the standard application, and controls a supply of predetermined electric power to the device (coprocessor 802). Subsequently, when the call-end key 14a is depressed, the main processor 801 terminates the particular application, shuts off the feeding of the predetermined electric power to the device (coprocessor 802), and thereafter displays the predetermined standby screen on the display 21.

With such a configuration, in the present invention, when a particular application is being activated, there is a possibility that another particular application is activated, and thus the activation state of the coprocessor 802 continues to be maintained as the ON (non-sleep) state. Moreover, when a depression operation of the call-end key 14a is confirmed, the coprocessor 802 is switched to the OFF state, and the predetermined standby screen is displayed on the display 21. Therefore, in the present invention, the coprocessor 802 is not always switched to the OFF state at the time of terminating a particular application, and the ON state is maintained in a case of continuous use, whereby it is possible to appropriately manage the power supply of the coprocessor 802, and to enhance the effect of saving electric power.

What is claimed is:

1. A portable electronic apparatus, comprising:
a display part,
a rotary dial portion that is attached to a body so as to be rotatable in a predetermined direction;
a touch sensor that detects contact to the rotary dial portion; and
a rotation detecting part that detects rotation of the rotary dial portion; and
a control part that controls such that a predetermined application is selected in accordance with a rotation state detected by the rotation detecting part, and a display screen corresponding to the activated predetermined application is displayed on the display part, wherein the control part controls such that the selected application is activated after a predetermined time passed in a state where contact to the rotary dial portion is not detected by the touch sensor.

* * * * *